United States Patent
Takada et al.

(10) Patent No.: US 10,636,304 B2
(45) Date of Patent: *Apr. 28, 2020

(54) MOVING OBJECT AND DRIVING SUPPORT SYSTEM FOR MOVING OBJECT

(71) Applicant: TOSHIBA MEMORY CORPORATION, Tokyo (JP)

(72) Inventors: Marie Takada, Yokohama Kanagawa (JP); Masanobu Shirakawa, Chigasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,315

(22) Filed: Apr. 1, 2019

(65) Prior Publication Data

US 2019/0228653 A1 Jul. 25, 2019

Related U.S. Application Data

(63) Continuation of application No. 15/906,378, filed on Feb. 27, 2018, now Pat. No. 10,262,533.

(30) Foreign Application Priority Data

Mar. 17, 2017 (JP) .................................. 2017-053462

(51) Int. Cl.
*G08G 1/0967* (2006.01)
*G08G 1/137* (2006.01)
(Continued)

(52) U.S. Cl.
CPC ....... *G08G 1/0967* (2013.01); *G06K 9/00805* (2013.01); *G06T 7/70* (2017.01);
(Continued)

(58) Field of Classification Search
CPC .... G08G 1/0967; G08G 1/137; G08G 1/0112; G08G 1/0141; G08G 1/04;
(Continued)

(56) References Cited

U.S. PATENT DOCUMENTS 6,747,687 B1 * 6/2004 Alves ..................... H04N 7/188
340/932.2
7,426,437 B2 * 9/2008 Breed .................. B60N 2/2863
701/301
(Continued)

FOREIGN PATENT DOCUMENTS

JP 2008-250503 A 10/2008
JP 4525915 B2 8/2010
(Continued)

OTHER PUBLICATIONS

Japanese Notice of Reasons for Refusal dated Jan. 17, 2020, filed in counterpart Japanese Patent Application No. 2017-053462, 8 pages (with Translation).

*Primary Examiner* — Joseph H Feild
*Assistant Examiner* — Rufus C Point
(74) *Attorney, Agent, or Firm* — Kim & Stewart LLP

(57) ABSTRACT

A driving support system includes a first monitoring device on a first object, the first monitoring device having a first controller, a first camera, and a first display, a second monitoring device on a second object, the second monitoring device having a second controller and a second camera, and a server in communication with the first and second monitoring devices. The first and second controllers are each detect a target in images acquired from the respective first or second camera, calculate target information for the target, and transmit the target information to the server. The server generates list information including the target information from the first and second monitoring devices, and transmits the list information to the first and second monitoring (Continued)

devices. The first controller further generates a map according to the list information received from the server, and displays the map on the first display.

20 Claims, 26 Drawing Sheets

(51) Int. Cl.
| | |
|---|---|
| *G08G 1/01* | (2006.01) |
| *G08G 1/04* | (2006.01) |
| *G06T 7/70* | (2017.01) |
| *G06K 9/00* | (2006.01) |

(52) U.S. Cl.
CPC ......... *G08G 1/0112* (2013.01); *G08G 1/0141* (2013.01); *G08G 1/04* (2013.01); *G08G 1/096716* (2013.01); *G08G 1/096741* (2013.01); *G08G 1/096775* (2013.01); *G08G 1/137* (2013.01); *G06T 2207/30261* (2013.01)

(58) Field of Classification Search
CPC ....... G08G 1/096716; G08G 1/096741; G08G 1/096775; G06K 9/00805; G06T 2207/30261
See application file for complete search history.

(56) References Cited

U.S. PATENT DOCUMENTS

| | | | | |
|---|---|---|---|---|
| 8,150,617 B2* | 4/2012 | Manber | ............. | G01C 21/3644 701/426 |
| 8,269,797 B2* | 9/2012 | Uchida | ............. | H04N 1/00408 345/668 |
| 8,493,198 B1* | 7/2013 | Vasquez | ................. | B60Q 9/008 340/425.5 |
| 8,660,735 B2* | 2/2014 | Tengler | ............ | G08G 1/096716 340/988 |
| 8,774,527 B1* | 7/2014 | Anguelov | .......... | G06K 9/00704 340/539.13 |
| 8,868,028 B1* | 10/2014 | Kaltsukis | ............... | H04W 4/029 455/404.2 |
| 8,933,795 B2* | 1/2015 | Lee | ........................ | B60Q 9/005 340/435 |
| 9,076,045 B2* | 7/2015 | Atsmon | ............. | G01C 21/3602 |
| 9,080,893 B2* | 7/2015 | Chang | ................ | G01C 21/3623 |
| 9,558,408 B2* | 1/2017 | Martin | ............... | G06K 9/00791 |
| 9,574,964 B2* | 2/2017 | Melen | .................. | B62D 15/025 |
| 10,026,314 B1* | 7/2018 | Philosof | ........... | G08G 1/096791 |
| 10,101,745 B1* | 10/2018 | Sun | ........................ | B60W 30/00 |
| 10,318,782 B2 | 6/2019 | Okumura et al. | | |
| 2016/0225259 A1* | 8/2016 | Harris | ............... | H04W 28/0247 |
| 2018/0075747 A1* | 3/2018 | Pahwa | ................. | B60W 40/09 |
| 2019/0251316 A1 | 8/2019 | Okumura et al. | | |

FOREIGN PATENT DOCUMENTS

| | | |
|---|---|---|
| JP | 2010-272128 A | 12/2010 |
| JP | 4792948 B2 | 10/2011 |
| JP | 4930187 B2 | 5/2012 |
| JP | 2016-024778 A | 2/2016 |
| JP | 2016-126538 A | 7/2016 |
| JP | 2016-181239 A | 10/2016 |
| JP | 2017-055177 A | 3/2017 |

* cited by examiner

FIG. 5A

| ROAD DIVISION | | RECOGNIZING IN VEHICLE | | | | UNRECOGNIZABLE IN MONITORING VEHICLE (BLIND SPOT) | | | |
|---|---|---|---|---|---|---|---|---|---|
| | | AUTOMOBILE | AUTOBIKE | BICYCLE | PEDESTRIAN | AUTOMOBILE | AUTOBIKE | BICYCLE | PEDESTRIAN |
| | FIRST DIVISION | Xc1_a1 | Xbi1_a1 | Xby1_a1 | Xp1_a1 | Xc1b_a1 | Xbi1b_a1 | Xbc1b_a1 | Xp1b_a1 |
| | SECOND DIVISION | Xc2_a1 | Xbi2_a1 | Xby2_a1 | Xp2_a1 | Xc2b_a1 | Xbi2b_a1 | Xbc2b_a1 | Xp2b_a1 |
| | THIRD DIVISION | Xc3_a1 | Xbi3_a1 | Xby3_a1 | Xp3_a1 | Xc3b_a1 | Xbi3b_a1 | Xbc3b_a1 | Xp3b_a1 |
| | FOURTH DIVISION | Xc4_a1 | Xbi4_a1 | Xby4_a1 | Xp4_a1 | Xc4b_a1 | Xbi4b_a1 | Xbc4b_a1 | Xp4b_a1 |

FIG. 5B

| ROAD DIVISION | | RECOGNIZING IN VEHICLE | | | | UNRECOGNIZABLE IN MONITORING VEHICLE (BLIND SPOT) | | | |
|---|---|---|---|---|---|---|---|---|---|
| | | AUTOMOBILE | AUTOBIKE | BICYCLE | PEDESTRIAN | AUTOMOBILE | AUTOBIKE | BICYCLE | PEDESTRIAN |
| | FIRST DIVISION | Yc1_a1 | Ybi1_a1 | Yby1_a1 | Yp1_a1 | Yc1b_a1 | Ybi1b_a1 | Ybc1b_a1 | Yp1b_a1 |
| | SECOND DIVISION | Yc2_a1 | Ybi2_a1 | Yby2_a1 | Yp2_a1 | Yc2b_a1 | Ybi2b_a1 | Ybc2b_a1 | Yp2b_a1 |
| | THIRD DIVISION | Yc3_a1 | Ybi3_a1 | Yby3_a1 | Yp3_a1 | Yc3b_a1 | Ybi3b_a1 | Ybc3b_a1 | Yp3b_a1 |
| | FOURTH DIVISION | Yc4_a1 | Ybi4_a1 | Yby4_a1 | Yp4_a1 | Yc4b_a1 | Ybi4b_a1 | Ybc4b_a1 | Yp4b_a1 |

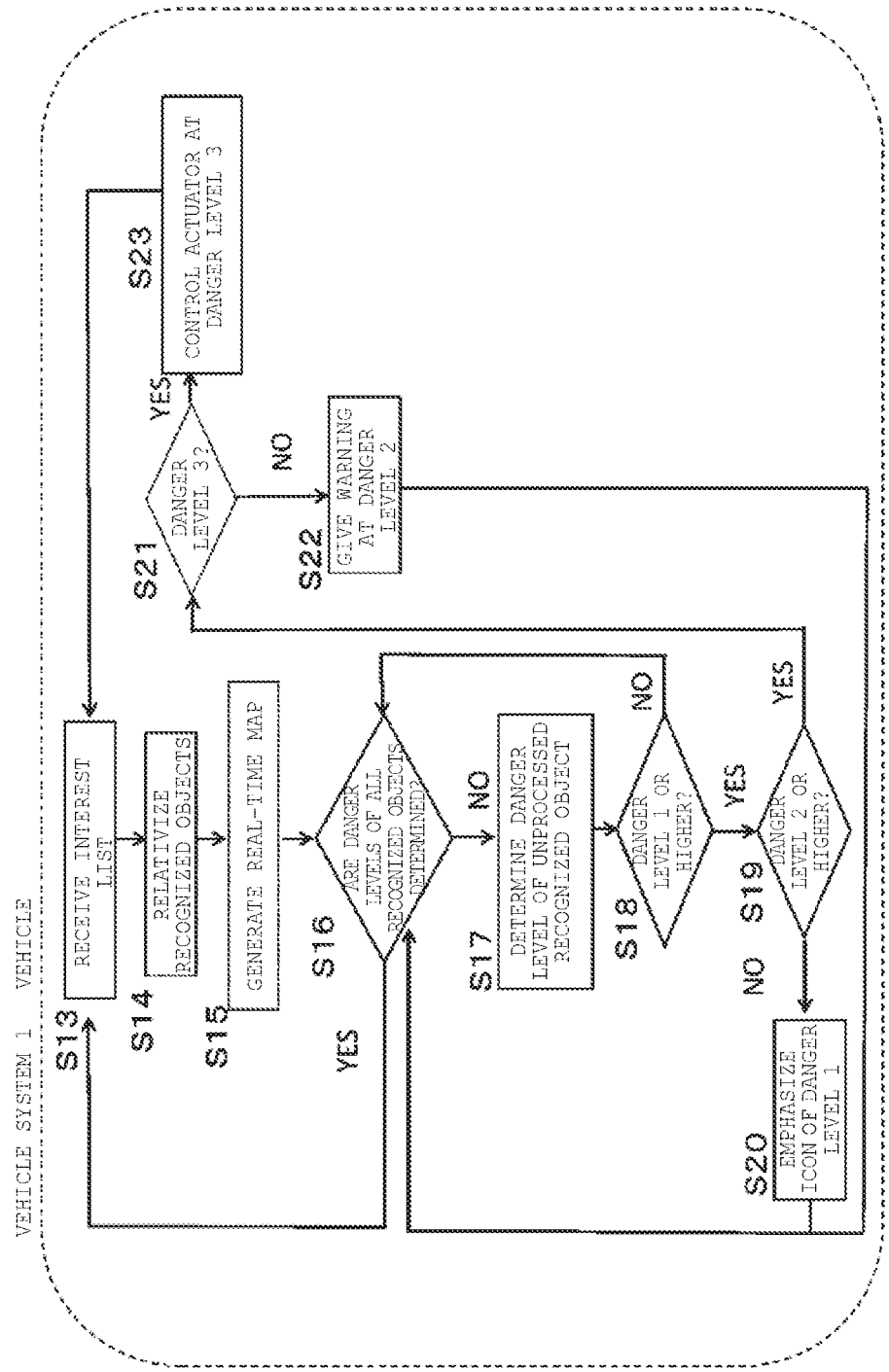

FIG. 10A

DATA TRANSMITTED BY VEHICLE a

| OWN INFORMATION | ID: | a |
|---|---|---|
| | TIME: | T1 |
| | GPS POSITIONAL INFORMATION: | (Xa1, Ya1) |
| | DIRECTION, ACCELERATION: | Da1, αa1 |
| | SPEED: | Va1 |
| LIST OF RECOGNIZED OBJECT | TYPE: | null |
| | RELATIVE POSITIONAL INFORMATION: | |
| | DIRECTION, ACCELERATION: | |
| | SPEED | |

FIG. 10B

DATA TRANSMITTED BY VEHICLE b

| OWN INFORMATION | ID: | b |
|---|---|---|
| | TIME: | T1 |
| | GPS POSITIONAL INFORMATION: | (Xb1, Yb1) |
| | DIRECTION, ACCELERATION: | Db1, αb1 |
| | SPEED: | Vb1 |
| LIST OF RECOGNIZED OBJECT 1 | TYPE: | VEHICLE |
| | POSITIONAL INFORMATION: | (Xb11, Yb11) |
| | DIRECTION, ACCELERATION: | Db11, αb11 |
| | SPEED: | Vb11 |

FIG. 10C

DATA TRANSMITTED BY VEHICLE c

| OWN INFORMATION | ID: | c |
|---|---|---|
| | TIME: | T1 |
| | GPS POSITIONAL INFORMATION: | (Xc1, Yc1) |
| | DIRECTION, ACCELERATION: | Dc1, αc1 |
| | SPEED: | Vc1 |
| LIST OF RECOGNIZED OBJECT 2 | TYPE: | BICYCLE d |
| | POSITIONAL INFORMATION | (Xc11, Yc11) |
| | DIRECTION, ACCELERATION: | Dc11, αc11 |
| | SPEED: | Vc11 |
| LIST OF RECOGNIZED OBJECT 3 | TYPE: | PEDESTRIAN e |
| | POSITIONAL INFORMATION | (Xc12, Yc12) |
| | DIRECTION, ACCELERATION: | Dc12, αc12 |
| | SPEED: | Vc12 |
| LIST OF RECOGNIZED OBJECT 4 | TYPE: | PEDESTRIAN f |
| | POSITIONAL INFORMATION | (Xc13, Yc13) |
| | DIRECTION, ACCELERATION: | Dc13, αc13 |
| | SPEED: | Vc13 |

FIG. 11

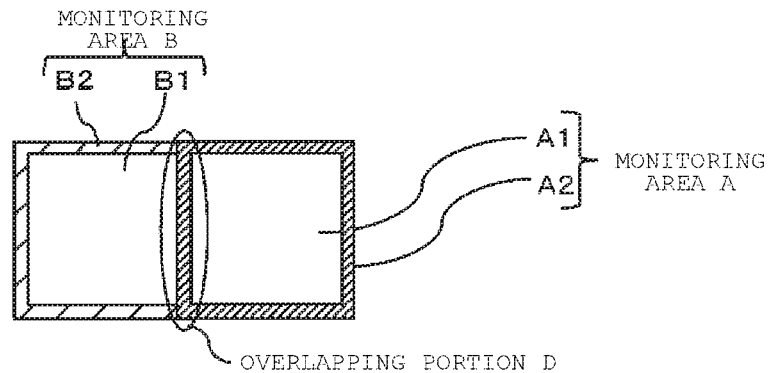

FIG. 12

INTEREST LIST
VEHICLE

| ID | a |
|---|---|
| TIME | T1 |
| GPS POSITIONAL INFORMATION | (Xa1, Ya1) |
| SPEED | Va1 |
| DIRECTION, ACCELERATION | Da1, αa1 |
| ROAD DIVISION | g-TH TYPE, h-TH GRADE |

| ID | b |
|---|---|
| TIME | T1 |
| GPS POSITIONAL INFORMATION | (Xb1, Yb1) |
| SPEED | Vb1 |
| DIRECTION, ACCELERATION | Db1, αb1 |
| ROAD DIVISION | g-TH TYPE, h-TH GRADE |

| ID | c |
|---|---|
| TIME | T1, Vc1 |
| GPS POSITIONAL INFORMATION | (Xc1, Yc1) |
| SPEED | Vc1 |
| DIRECTION, ACCELERATION | Dc1, αc1 |
| ROAD DIVISION | g-TH TYPE, h-TH GRADE |

BICYCLE

| TYPE | BICYCLE d |
|---|---|
| POSITIONAL INFORMATION | (Xb11, Yb11) |
| DIRECTION, ACCELERATIONS | Db11, αb11 |
| SPEED | Vc11 |

PERSON

| TYPE | PEDESTRIAN e |
|---|---|
| POSITIONAL INFORMATION | (Xc12, Yc12) |
| DIRECTION, ACCELERATIONS | Dc12, αc12 |
| SPEED | Vc12 |
| TYPE | PEDESTRIAN f |
| POSITIONAL INFORMATION | (Xc13, Yc13) |
| DIRECTION, ACCELERATIONS | Vc13 |
| SPEED | Dc13, αc13 |

DATA TRANSMITTED BY VEHICLE h

| OWN INFORMATION | ID: | h |
|---|---|---|
| | TIME: | T3 |
| | GPS POSITIONAL INFORMATION: | (Xh1, Yh1) |
| | DIRECTION, ACCELERATION: | Dh1, αh1 |
| | SPEED | Vh1 |
| | WEATHER | SNOW |
| LIST OF RECOGNIZED OBJECT | TYPE: | null |
| | RELATIVE POSITIONAL INFORMATION: | |
| | DIRECTION, ACCELERATION: | |

MOVING OBJECT AND DRIVING SUPPORT SYSTEM FOR MOVING OBJECT

CROSS-REFERENCE TO RELATED APPLICATIONS

This application is a continuation of U.S. patent application Ser. No. 15/906,378, filed on Feb. 27, 2018, which is based upon and claims the benefit of priority from Japanese Patent Application No. 2017-053462, filed on Mar. 17, 2017, the entire contents of each of which are incorporated herein by reference.

FIELD

Embodiments described herein relate generally to a moving object and a driving support system including the moving object.

BACKGROUND

In recent years, there have been proposed in-vehicle devices that include cameras or various sensors on vehicles, to collect information about the vehicle's surroundings to give warnings if a driver overlooks a danger detected by the camera/or sensor.

DESCRIPTION OF THE DRAWINGS

FIG. 5A depicts example conditions for a danger level based on distances.

FIG. 5B depicts example conditions for a danger level based on speed differences.

FIGS. 6A, 6B, and 6C are flowcharts of vehicle systems.

FIGS. 10A, 10B, and 10C depict example information transmitted by the vehicles, respectively.

FIG. 11 depicts two monitoring areas having an overlapping portion.

FIG. 12 depicts an example interest list generated by a server data control unit.

DETAILED DESCRIPTION

Figure 1:
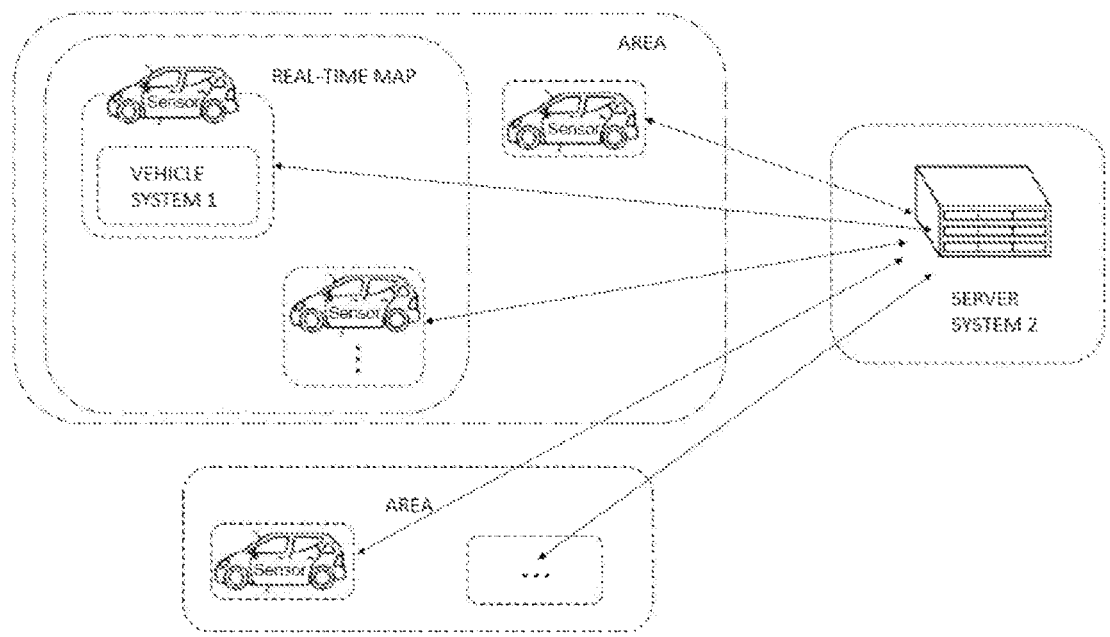
FIG. 1 depicts an overall configuration of a driving support system according to a first embodiment.

In general, according to one embodiment, a driving support system includes a first monitoring device on a first object, the first monitoring device having a first controller, a first camera, and a first display, a second monitoring device on a second object, the second monitoring device having a second controller and a second camera, and a server in communication with the first and second monitoring devices. The first and second controllers are each configured to detect a target in images acquired from the respective first or second camera, calculate target information for the target, and transmit the target information to the server. The server is configured to generate list information including the target information from the first and second monitoring devices, and transmit the list information to the first and second monitoring devices when the first and second objects are within a first monitoring area. The first controller is further configured to generate a map according to the list information received from the server, and display the map on the first display.

Hereinafter, example embodiments will be described with reference to the drawings. In the following description, substantially similar components are denoted by the same reference numerals and a detailed description of these components will be omitted. In addition, the embodiments described below are shown as examples for illustrative purposes and the depicted materials, shapes, structures, arrangements, and the like are for example and not limitations.

In the following description, a moving object will be described mainly as a vehicle. It should be noted that the particular vehicles described below are some possible examples of a moving object and do not limit the present disclosure.

Terms to be used in the example embodiments describe below are defined as follows.

(1) "Driving Information": Driving information includes a current time, and a vehicle ID, a position, a traveling direction, a speed, and acceleration of a vehicle at the current time.

(2) "Target Information": Target information includes a type, a position, a traveling direction, a speed, and acceleration of an object that is detected according to an image of a vehicle's surroundings.

(3) "List Information": List information is a combination of the driving information and the target information.

(4) "Monitoring Area": A monitoring area is a range in which the driving information and the target information acquired by a vehicle are shared with other vehicles via a server. The vehicles within the same monitoring area receive common information from a server.

(5) "Real-time Map": A real-time map is a map showing targets detected in a vehicle's surroundings. The real-time map is frequently updated in a real time response to an input signal. A range of the real-time map (also referred to as a mapping area) may be several tens meters from a vehicle and may be the same as or smaller than a monitoring area. The real-time map is displayed on a display unit, for example, on a windshield of a vehicle.

(6) "Road Division": Road division is road division according to road types, for example, a highway or an urban area.

(7) "Interest List Information": Interest list information is collection of list information of each monitoring area and road division information corresponding to the position of a vehicle. The interest list information is stored in a server at each time.

First Embodiment

A driving support system according to a first embodiment will be described with reference to FIGS. 1 to 16.

Example of Overall Configuration of Driving Support System

FIG. 1 depicts an overall configuration of a driving support system 100 according to the first embodiment. As illustrated in FIG. 1, the driving support system 100 includes a monitoring system 1 on a vehicle and a server system 2. Hereinafter, a monitoring system on a vehicle may be simply referred to as a vehicle system.

Figure 2:
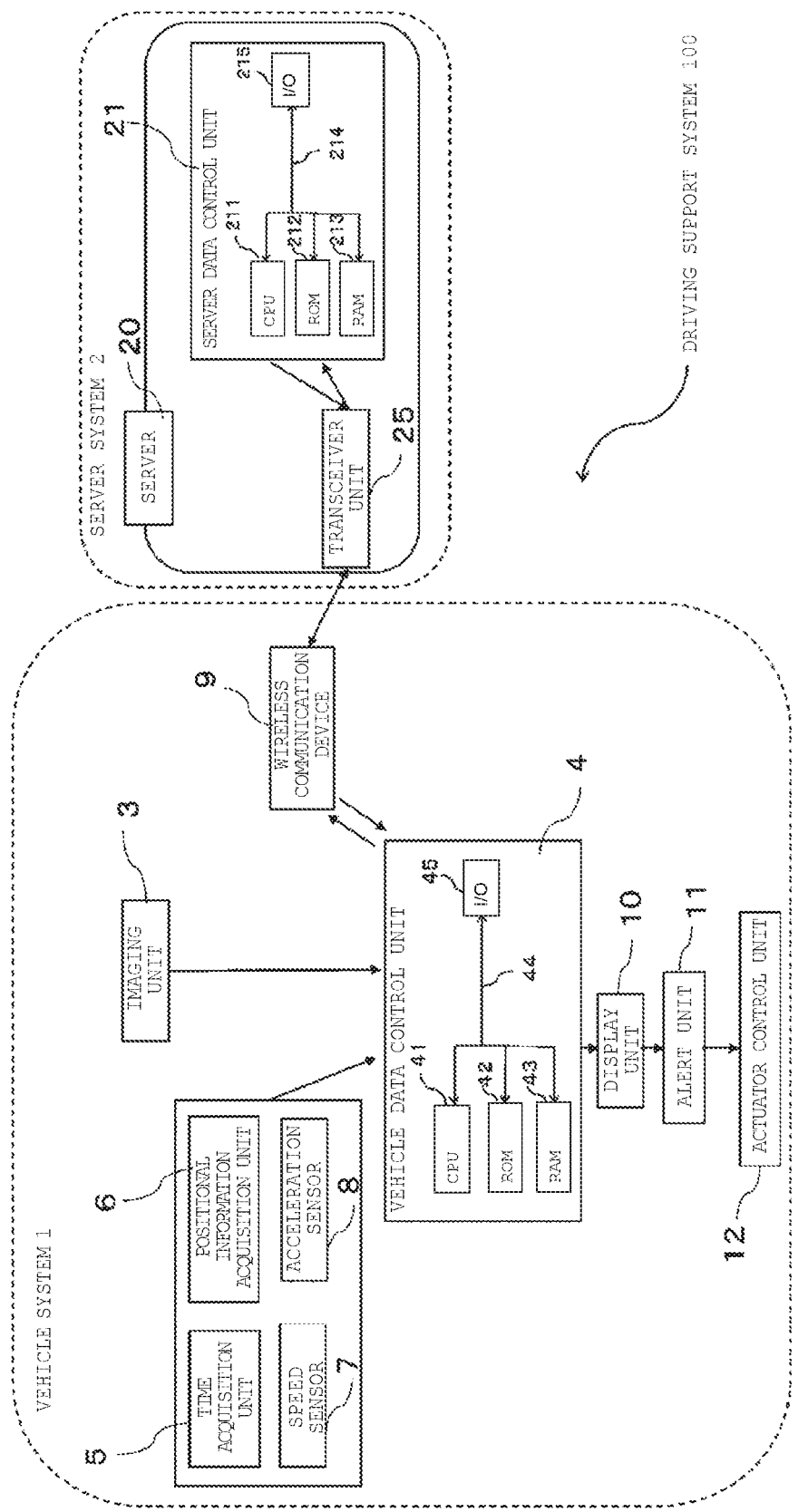
FIG. 2 is a block diagram of a driving support system according to the first embodiment.

As illustrated in FIG. 2, the vehicle system 1 includes an image capturing unit 3, a vehicle data control unit 4 (also referred simply to as a data control unit hereinafter), a time acquisition unit 5, a positional information acquisition unit 6, a speed sensor 7, an acceleration sensor 8, a wireless communication device 9, a display unit 10, an alert unit 11, and an actuator control unit 12.

The server system 2 includes a server 20. The server 20 includes a server data control unit 21 and a transmission and reception unit 25. Vehicle system 1

The vehicle system 1 is a system that is mounted on, for example, a vehicle. The vehicle system 1 acquires driving information regarding the vehicle on which the vehicle system 1 is mounted and transmits the driving information to the server system 2 in conjunction with target information regarding a target, for example, the position of a pedestrian or a walking speed, acquired by the vehicle. The vehicle system 1 supports safe driving of the vehicle by generating a real-time map based on the information regarding a target received from the server system and displaying a potential danger on, for example, the display unit 10.

FIG. 2 is a block diagram of the driving support system 100 according to the first embodiment.

The vehicle system 1 includes the image capturing unit 3, the vehicle data control unit 4, the time acquisition unit 5, the positional information acquisition unit 6, the speed sensor 7, the acceleration sensor 8, the wireless communication device 9, the display unit 10, the alert unit 11, and the actuator control unit 12.

The image capturing unit 3 is, for example, a CCD camera. The image capturing unit 3 images, for example, the front or the periphery of the vehicle. The image capturing unit 3 is connected to the vehicle data control unit 4. The image capturing unit 3 typically transmits a captured image or moving image to the vehicle data control unit 4.

The time acquisition unit 5 includes a clock or the like and acquires a current time. However, in some embodiments a clock is not provided in the time acquisition unit 5. For example, a current time may be acquired externally.

The positional information acquisition unit 6 receives a signal from a Global Positioning System (GPS) satellite or the like and acquires the position of the vehicle. However, the positional information acquisition unit 6 may acquire a signal for specifying the position of the vehicle other than a signal from the GPS satellite.

The speed sensor 7 and the acceleration sensor 8 measure a speed and acceleration of the vehicle.

Figure 3A:
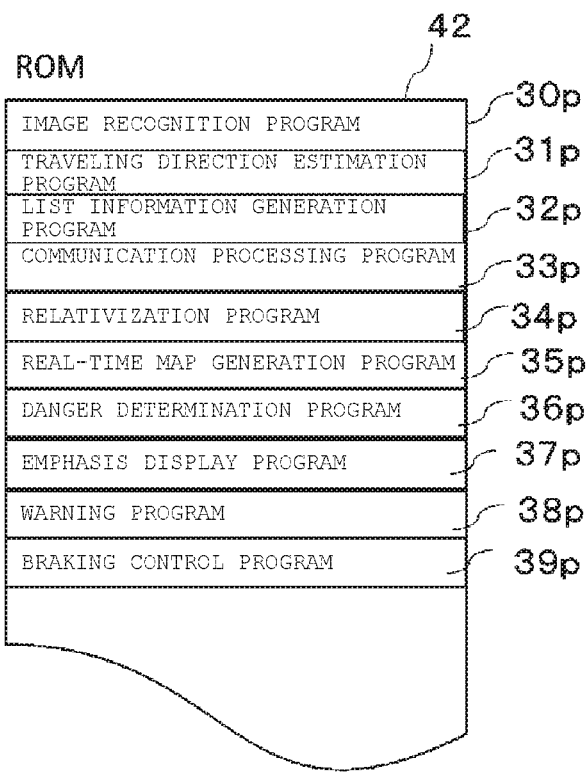
FIGS. 3A and 3B are schematic diagrams of storage regions of ROMs.

The vehicle data control unit 4 controls the entire vehicle system 1. The vehicle data control unit 4 includes, for example, a central processing unit (CPU) 41, a read-only memory (ROM) 42, a random-access memory (RAM) 43, an interface 45 for input and output control, and a bus line 44. As illustrated in FIG. 3A, the ROM 42 stores various programs 30p to 39p. The CPU 41 reads the programs to the RAM 43 to be executed.

Figure 4:
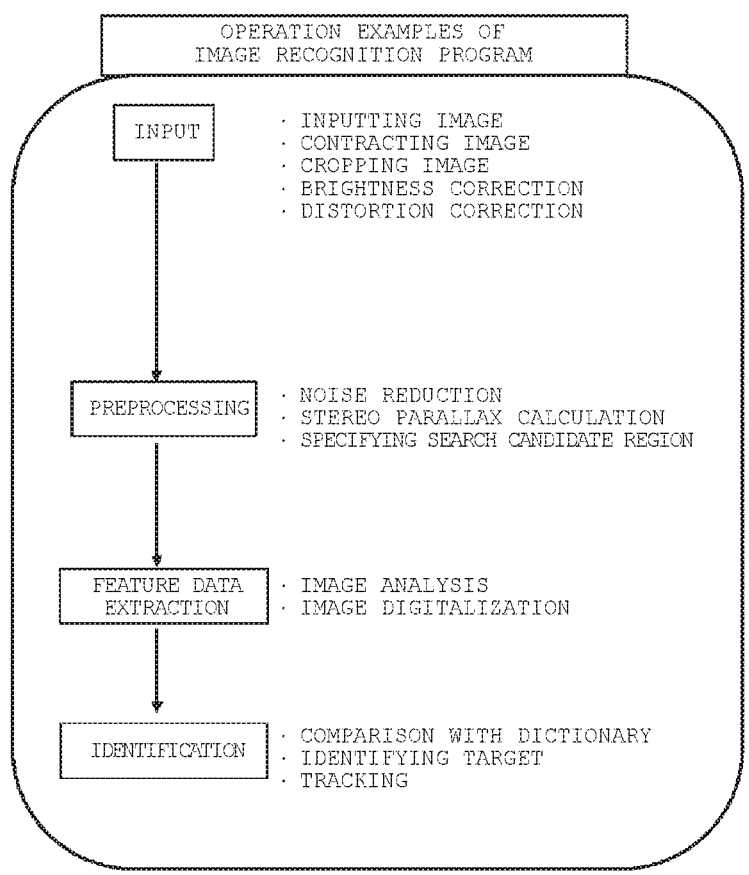
FIG. 4 depicts an operation example of an image recognition program.

The image recognition program 30p is a program for executing image processing on the image or the moving image input from the image capturing unit 3 and detects a target such as a person, a vehicle, or the like. The vehicle data control unit 4 detects a target or a motion of the target from the image or the moving image according to the image recognition program 30p. Specifically, as illustrated in FIG. 4, the vehicle data control unit 4 executes image processing through four processes, "inputting", "preprocessing", "feature data extraction", and "identification" according to the image recognition program 30p. In the "inputting" process, inputting, contracting, and cropping an image or a moving image, brightness correction, or distortion correction is executed on the image or the moving image. In the "preprocessing" process, noise reduction, stereo parallax calculation, or specifying search candidate region is executed. In the "feature data extraction" process, image analysis or image digitalization is executed. In the "identification" process, a process of identifying and tracking a target is executed. The image recognition program 30p may be installed, for example, with a separate configuration such as an image recognition processor LSI. The configuration of the image recognition processor LSI is disclosed in, for example, US Patent Application Publication No. 2012/0183207 applied on Mar. 21, 2011 and titled "Image Processing Device and Image Processing System", US Patent Application Publication No. 2012/0288205 applied on Aug. 11, 2011 and titled "Image Processing Device, Image Processing System, and Image Processing Method", US Patent Application Publication No. 2012/0243778 applied on Sep. 9, 2011 and titled "Image Identifying Device and Image Identifying method", U.S. Pat. No. 5,978,937 applied on Dec. 28, 1995 and titled "Microprocessor and Debug System", US Patent Application Publication No. 2008/0244192 applied on Mar. 24, 2008 and titled "Multi-processor System", US Patent Application Publication No. 2010/0005271 applied on Nov. 12, 2012 and titled "Memory Controller", US Patent Application Publication No. 2010/0103282 applied on Oct. 28, 2008 and titled "Image Processing Device", US Patent Application Publication No. 2010/0110289 applied on Aug. 13, 2009 and titled "Image Processing Processor", US Patent Application Publication No. 2010/0034459 applied on Aug. 6, 2009 and titled "Feature Extraction Device, Feature Extraction Method, Image Processing Device, and Program", US Patent Application Publication No. 2012/0057787 applied on Sep. 1, 2011 and titled "Feature Data Calculation Device and Identifying Device", US Patent Application Publication No. 2013/0326203 applied on Aug. 27, 2012 and titled "Multi-processor", US Patent Application Publication No. 2010/0034465 applied on Aug. 6, 2009 and titled "Feature Data Extraction Device, Feature Data Extraction Method, Image Processing Device, and Program", U.S. Pat. No. 7,444,553 applied on Jun. 9, 2005 and titled "Trace Device", and US Patent Application Publication No. 2011/0138371 applied on Sep. 7, 2010 and titled "Compile Device". The entire contents of the above listed applications are incorporated herein by reference.

The traveling direction estimation program $31p$ is a program for calculating an azimuth in a traveling direction of a vehicle based on driving information of the vehicle, for example, positional information, speed information, or acceleration information. The vehicle data control unit 4 calculates the traveling direction of the vehicle according to the traveling direction estimation program $31p$.

For example, when the vehicle obtains latitude and longitude coordinates in a polar coordinate system (at0, bt0) at time t0 and (at1, bt1) at time t1, an azimuth angle can be calculated from a movement between time t0 and time t1 by the following equation.

$$\text{Azimuth angle} = 90 - \tan^{-1}(\sin(at1-at0), \cos(bt0)\tan(bt1) - \sin(bt0)\cos(at1-at0)) \quad (1).$$

Thus, the traveling direction of the vehicle can be calculated. Here, the azimuth angle is measured clockwise from a north base line. In some embodiments coordinates in other coordinate systems may be used. The traveling direction may be calculated from a speed or acceleration.

The list information generation program $32p$ is a program for listing driving information of each vehicle and target information regarding targets detected by each vehicle. A list generated by the vehicle data control unit 4 according to the list information generation program $32p$ is referred to as list information. The list information is a list of information such as a vehicle ID, a data acquisition time, GPS positional information, a traveling direction, and acceleration of a vehicle, and a type, relative positional information, a traveling direction, and acceleration of a target. FIG. 10 depicts examples of the list information.

The communication processing program $33p$ is a program for communicating with the server 20.

The relativization program $34p$ is a program for calculating a relative distance or a relative speed of a vehicle to a target based on driving information of the vehicle and information regarding the target in an interest list.

The real-time mapping generation program $35p$ is a program for acquiring information regarding a target located in a monitoring area from the interest list, combining the driving information of the vehicle with the information regarding the target in real time, and generating a map showing a positional relation between the vehicle and each target around the vehicle.

The danger determination program $36p$ is a program for determining a danger level by comparing a relative distance or a relative speed calculated using the relativization program $34p$ to a pre-determined threshold. Here, the danger level indicates a possibility that the vehicle collides with a target in the future. For example, when a vehicle is running along a predicted driving route and a probability of collision with the target increases, a higher danger level is determined. For the danger level, there are three levels, danger levels 1 to 3. As the probability of collision with the target is higher, the danger level is higher. That is, the possibility of collision with a target at danger level 2 is higher than at danger level 1. The possibility of collision with a target at danger level 3 is higher than at danger level 2. At danger level 1, a driver only needs to drive a vehicle with caution for a target. At danger level 2, a driver can avoid a collision by himself or herself when a probability of collision of a vehicle with a target is higher than at danger level 1. At danger level 3, a probability of collision of the vehicle with the target further increases to be higher than danger level 2, and thus the driver may not avoid the collision by himself or herself.

FIGS. 5A and 5B depict example conditions for danger level 1. FIG. 5A is a table including distances (referred to as a distance table) between a vehicle and various targets in various road divisions at danger level 1 or higher. FIG. 5B is a table including speed differences (referred to as a speed difference table) between the vehicle and the various targets in various road divisions at danger level 1 or higher. A different threshold is set for each target at each time in FIGS. 5A and 5B. An appropriate threshold is preferably set based on information such as a braking distance until a vehicle comes to a complete stop after brakes are fully applied, previous accident information of a driver, and time duration required to avoid a collision. When danger level is determined higher than level 1 for either the distance table or the speed difference table, a higher danger level is determined. The danger level may be determined for each type of targets or each road division differently if appropriate.

Each table may be stored in the danger determination program $36p$ along with an algorithm for determining a danger.

Danger levels 2 and 3 are determined similarly to danger level 1. Thresholds at danger levels 2 and 3 in the distance table are smaller than at level 1, and thresholds at danger levels 2 and 3 in the speed difference table are larger than at danger level 1. The distance tables and the speed difference tables of danger levels 2 and 3 are the same as those in FIGS. 5A and 5B. Since only the values of the thresholds are changed, the description thereof will be omitted herein.

As described above, the vehicle data control unit 4 determines a danger level by referring to a distance or a speed difference between the vehicle and a target and the thresholds in the tables of FIGS. 5A and 5B according to the danger determination program $36p$.

The emphasis display program $37p$ is a program for emphasizing an icon of a target with which a collision possibility is high at danger level 1 and displaying the icon of the target on a display unit.

The warning program $38p$ is a program for transmitting a warning to the alert unit 11 at danger level 2. The alert unit 11 issues a warning sound to prompt a driver to decelerate a vehicle.

The braking control program $39p$ is a program for controlling the actuator control unit 12 at danger level 3.

The wireless communication device 9 executes wireless data communication with the server system 2. The wireless communication device 9 frequently transmits list information to the server 20 or conversely frequently receives the interest list information from the server 20.

The display unit 10 displays a real-time map generated by the vehicle data control unit 4. As the display unit 10, for example, a display may be installed inside the vehicle. However, a display may be installed on a windshield or the like. On the display unit 10, a target on the real-time map may also be displayed with an icon or the like.

The alert unit 11 is a device that outputs, for example, a sound, light, or vibration. At danger level 2, the vehicle data control unit 4 transmits an execution command to the alert unit 11 according to the warning program 38p.

The actuator control unit 12 is executed by the vehicle data control unit 4 at danger level 3. The actuator control unit 12 controls a motion of the vehicle.

Server System 2

The server system 2 receives the list information from a plurality of vehicle systems 1. The server data control unit 21 determines a monitoring area to which each vehicle belongs with reference to the positional information of the vehicle in the received list information. Thereafter, an interest list is generated from the list information obtained from a plurality of vehicles, each having a vehicle system 1 and belonging to the monitoring area. The interest list is transmitted to all the vehicles in the monitoring area. The interest list is a list in which a vehicle ID, the driving information and the list information collected at each monitoring area in the server, and information regarding a current monitoring area corresponding to a road division classified by a type or a grade are summarized at each time. An example interest list will be described with reference FIG. 10 in the description of an operation.

The configuration of the server system 2 will be described with reference to FIG. 2.

The server system 2 includes the server 20. The server 20 includes a server data control unit 21 and a transmission and reception unit 25.

The transmission and reception unit 25 executes wireless communication between the vehicle system 1 and the server system 2. For example, the transmission and reception unit 25 receives the list information from the vehicle system 1. The transmission and reception unit 25 frequently transmits the interest list to the vehicle system 1.

Figure 3B:
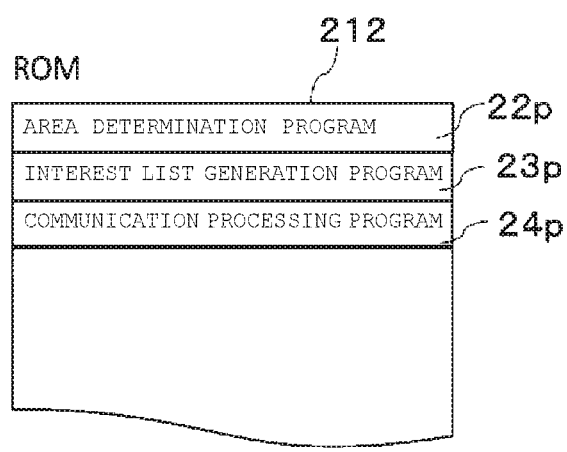

The server data control unit 21 controls the entire server system 2. The server data control unit 21 includes, for example, a CPU 211, a ROM 212, a RAM 213, an interface 215 for input and output control, and a bus line 214 connecting them. As illustrated in FIG. 3B, the ROM 212 stores various programs 22p to 24p. The CPU 211 reads the programs to the RAM 213 to execute the programs.

The monitoring area determination program 22p is a program for determining a monitoring area to which a vehicle belongs from the positional information of the vehicle included in the list information.

The interest list generation program 23p is a program for generating an interest list by chronologically summarizing the driving information or the target information in all the list information in the monitoring area.

The communication processing program 24p is a program for communicating with the vehicle system 1.

Operation

Next, an operation according to an example embodiment will be described with reference to the flowchart of FIGS. 6A to 6C. In the following description, example arrangements of vehicles and targets illustrated in FIGS. 7 to 15 are considered. It should be noted the particular operations and arrangements described below are some possible examples and do not limit the present disclosure.

First, the vehicle system 1 acquires an image or a moving image in the periphery of the vehicle from the image capturing unit 3 (step S1). The acquired image or moving image is transmitted from the image capturing unit 3 to the vehicle data control unit 4. The vehicle data control unit 4 extracts a type, positional information, a direction, a speed, and acceleration of the acquired target as target information according to the image recognition program 30p (step S2). For example, when a pedestrian is detected through image recognition, the vehicle data control unit 4 analyzes the image of the pedestrian to obtain a position, a direction, a speed, and acceleration of the pedestrian.

Subsequently, the vehicle data control unit 4 acquires a current time and driving information such as a position, a speed, and acceleration of the vehicle at the current time in the time acquisition unit 5, the positional information acquisition unit 6, the speed sensor 7, and the acceleration sensor 8 (step S3). The time acquisition unit 5 acquires the current time when the image capturing unit 3 acquires the image or the moving image.

The vehicle data control unit 4 calculates a traveling direction of the vehicle according to the traveling direction estimation program 31p (step S4).

In the example embodiments described herein, steps S1 to S4 are executed in this order, but in some embodiments the steps S1 to S4 may be executed in a different order. For example, the processes of steps S1 and S2 may be executed in parallel with steps S3 and S4.

Subsequently, the vehicle data control unit 4 forms the list information according to the list information generation program 32p (step S5). The vehicle data control unit 4 is connected to the server 20 for communication according to the communication processing program 33p (step S6). Then, the wireless communication device 9 transmits the list information to the server 20 of the server system 2 (step S7).

Figure 7:
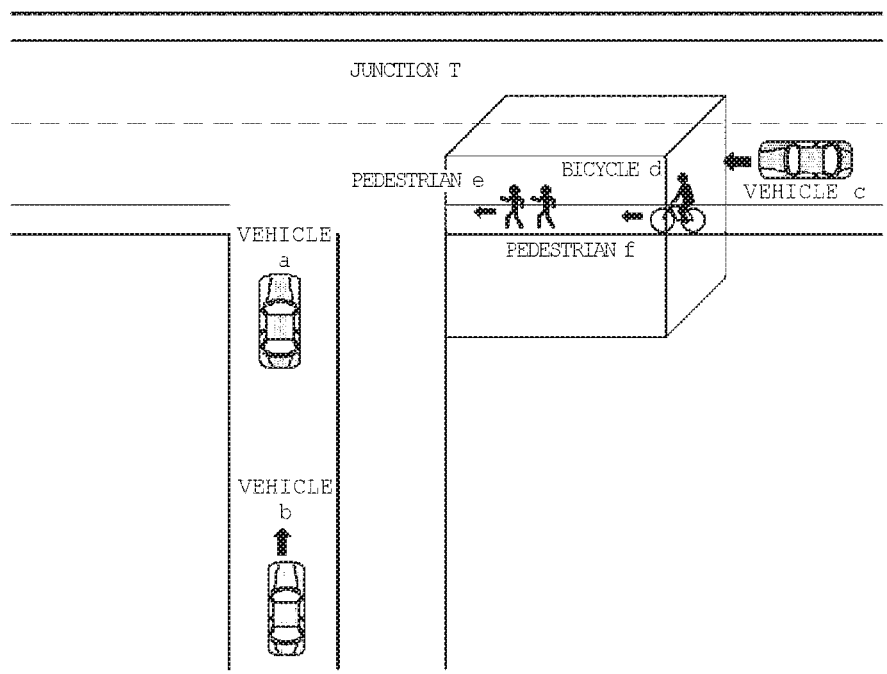
FIG. 7 is a top view of an example of a monitoring area at a particular time T1.
Figure 8A:
FIGS. 8A, 8B, and 8C depict visual information from vehicles in the monitoring area at the particular time T1, respectively.
Figure 8B:
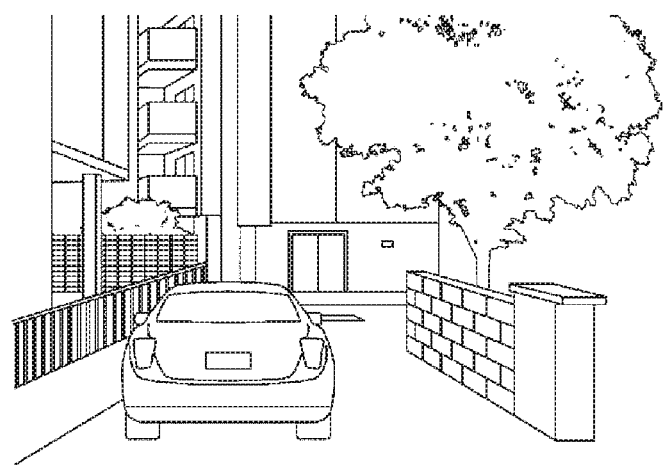
Figure 8C:
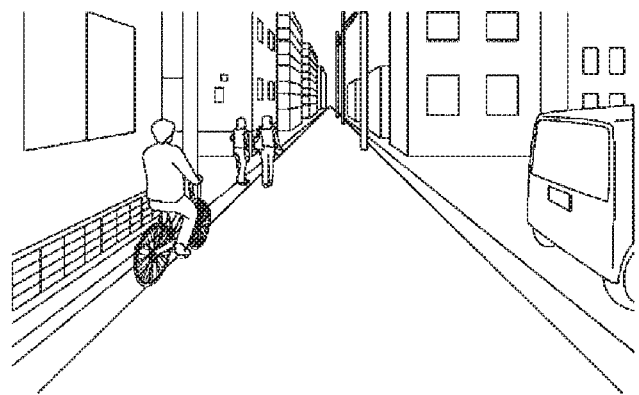
Figure 9A:
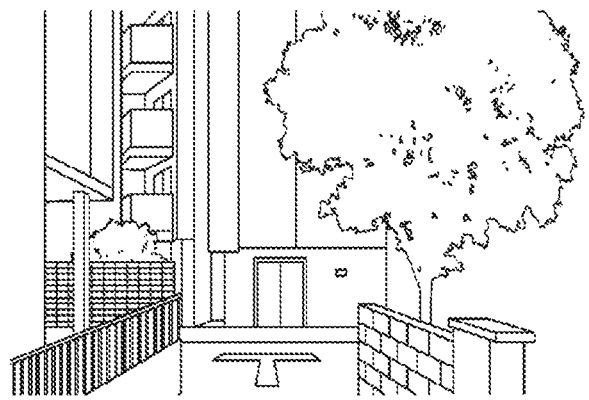
FIGS. 9A, 9B, and 9C depict image recognition from the vehicles in the monitoring area at the particular time T1.
Figure 9B:
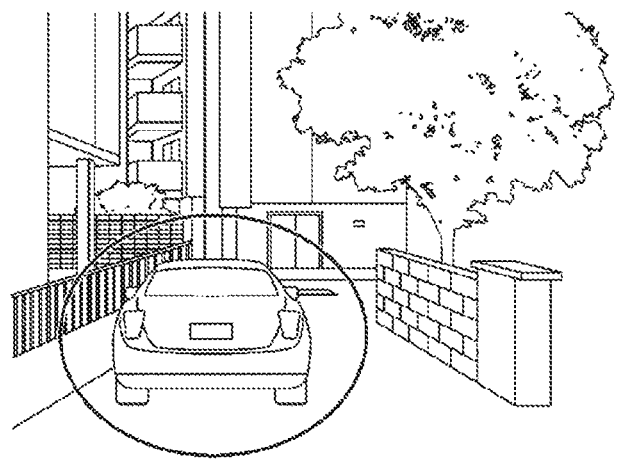
Figure 9C:
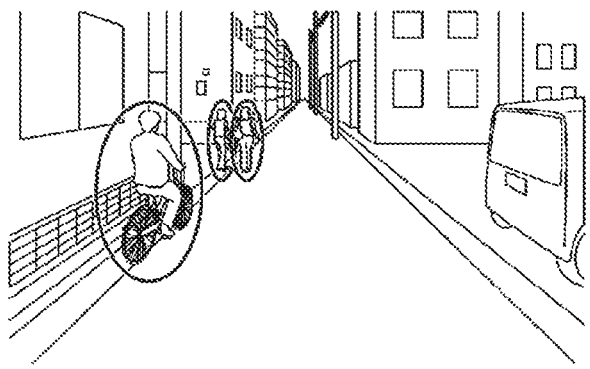

FIG. 7 is a top view of an example monitoring area A at time T1. FIGS. 8A, 8B, 8C depict visual information from vehicles a, b, and c in the monitoring area A at time T1, respectively. FIGS. 9A, 9B, and 9C depict image recognition of vehicles a, b, and c at time T1, respectively.

In FIG. 7, the visual information from each vehicle is as follows. That is, when viewed from the vehicle a, a building is an obstacle. Thus, pedestrians e and f, a bicycle d, and the vehicle c located at a junction T may not be seen. The vehicle a in front of the vehicle b can be seen from the vehicle b, but the pedestrians e and f, the bicycle d, and the vehicle c located at a junction T may not be seen by the vehicle a. The pedestrians e and f and the bicycle d can be seen from the vehicle c, but may not been seen by the vehicles a and b.

In the following description, the vehicle a monitors the vehicles considered and c. The vehicle a acquires the image or the moving image in the periphery of the vehicle from the image capturing unit 3 in step S1. In FIG. 7, since there is no target detected by the vehicle a, there is no information regarding a target in step S2. Subsequently, the process proceeds to step S3 and the vehicle data control unit 4 of the vehicle a acquires time T1, a position, a speed, and acceleration when the vehicle a acquires the image. The process proceeds to step S4 and the traveling direction of the vehicle a is calculated.

In step S5, the vehicle data control unit 4 of the vehicle a forms the list information according to the list information generation program 32p. FIG. 10A depicts an example list information generated by the list information generation program 32p.

In step S6, the vehicle data control unit 4 of the vehicle a connects to the server 20 for communication. In step S7, the communication device 9 of the vehicle a transmits the generated list information to the server 20. In the vehicles b and c, steps S1 to S7 are also executed. Since steps S1 to S7 are the same, the description thereof will be omitted. FIGS. 10B and 10C depict example list information generated by the list information generation program 32p of the vehicles b and c.

Figure 6A:
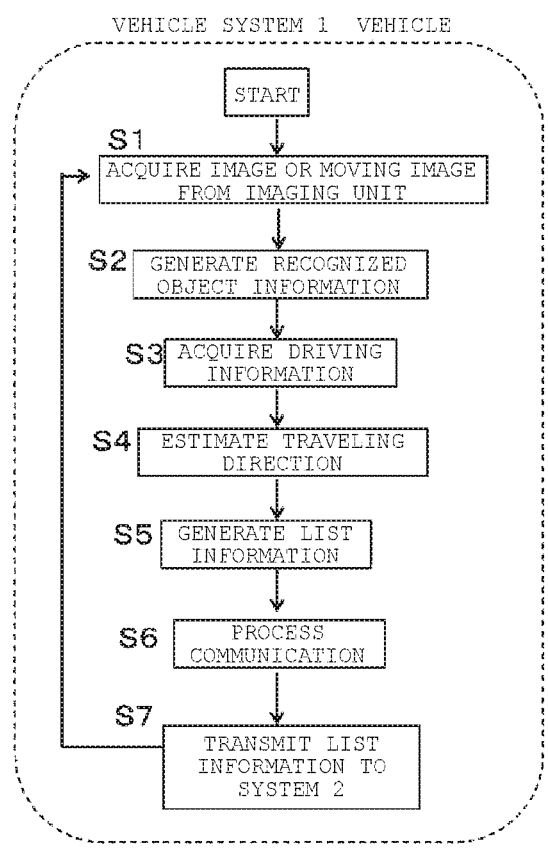
Figure 6C:
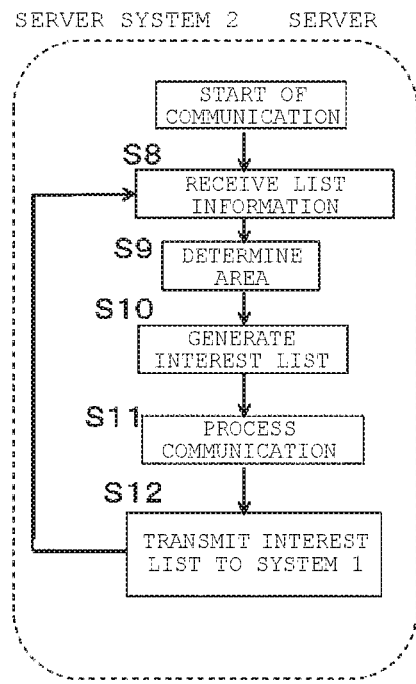

Subsequently, as illustrated in FIGS. 6A to 6C, the transmission and reception unit 25 of the server 20 of the server system 2 receives the list information transmitted from the plurality of vehicle systems 1 (step S8). The received list information is transmitted to the server data control unit 21. The server data control unit 21 determines a monitoring area the vehicle belongs to from the first received list information according to the monitoring area determination program 22p (step S9). That is, when the vehicle belongs to the monitoring area A in which the positional information of the vehicle is pre-set in the server 20, the server data control unit 21 determines that the vehicle is located to the monitoring area A.

Subsequently, the server data control unit 21 lists the list information for each area. The server data control unit 21 generates the interest list using the interest list generation program 23p (step S10). The server data control unit 21 enables communication between the transmission and reception unit 25 and the vehicle system 1 according to the communication processing program 24 (step S11). Then, the transmission and reception unit 25 transmits the list information to all the vehicle systems 1 located in the monitoring area (step S12).

The monitoring area A at time T1 illustrated in FIG. 7 is determined as follows. The transmission and reception unit 25 receives the list information illustrated in FIGS. 10A to 10C from each vehicle. In step S9, the server data control unit 21 acquires the positional information in the list information and determines the monitoring area.

In the example embodiments described herein, positional information (Xa1, Ya1) of the vehicle a, positional information (Xb1, Yb1) of the vehicle b, and positional information (Xc1, Yc1) of the vehicle c at time T1 indicated in the list information illustrated in FIGS. 10A to 10C are assumed to be located in the monitoring area A, and the server data control unit 21 determines that the vehicles a to c belong to the monitoring area A.

Monitoring Area

In the example embodiments described herein, the monitoring area is assumed to be, for example, a square with one side of 10 m as illustrated in FIG. 11. Each monitoring area has an overlapping portion D with an adjacent monitoring area. Thus, even when the vehicle is moving, the vehicle transitions from one monitoring area to another monitoring area continuously. In the example embodiments described herein, the monitoring area is square-shaped, but the monitoring area may be a circular area with a radius of 10 m and the outer circumference of the circle may passes through the center of an adjacent circle.

Even when the vehicle a is moving, the monitoring area to which the vehicle a belongs is not changed as long as the vehicle a stays in the same monitoring area. That is, as illustrated in FIG. 7, the server data control unit 21 determines that the vehicle a is in the monitoring area A as long as the positional information of the vehicle a belongs to the monitoring area A. In FIG. 11, the monitoring area A includes an inner portion A1 and an outer circumference A2, and a monitoring area B similarly includes an inner portion B1 and an outer circumference B2. When the vehicle a moves from the monitoring area A to the monitoring area B passing over the boundary between the monitoring areas, the monitoring area to which the vehicle a belongs is changed. However, since the monitoring areas A and B have the overlapping portion D, the server data control unit 21 can change the monitoring area of the vehicle in a seamless manner. Even when the vehicle belongs to the monitoring area with a larger area, the vehicle may be assumed to belong both of the overlapping areas in the overlapping portion D. In this case, the vehicle receives all the interest lists overlapping areas from the server 20.

Subsequently, the server data control unit 21 generates the interest list for each area from the received list information in step S10. FIG. 12 depicts an example interest list generated by the server data control unit 21. The interest list in FIG. 12 is information including the list information regarding each vehicle illustrated in FIG. 10.

In step S11, the server data control unit 21 is connected to all the vehicles a, b, and c belonging to the monitoring area A for communication. Then, in step S12, the transmission and reception unit 25 transmits the interest list illustrated in FIG. 12 to all the vehicles connected for communication.

The server 20 acquires the driving information and the list information in real time from the vehicles. The server data control unit 21 subsequently generates the interest list of the monitoring area A based on the acquired driving information and list information. The generated interest list is transmitted to all the vehicles located in the monitoring area every time in step S12. That is, the vehicles belonging to the same monitoring area frequently receive the common interest list from the server 20.

As illustrated in FIG. 6, the wireless communication device 9 of the vehicle system 1 receives the interest list from the server system 2 (step S13). The vehicle data control unit 4 executes the following process from the interest list information.

The vehicle data control unit 4 calculates the relative distance or the relative speed based on the driving information of the vehicle and information regarding a target in the interest list according to the relativization program 34p (step S14). A time lag occurs at the time of transmission and the time of reception due to passing through the server 20 once, but the list information is corrected based on the positional information of the vehicle. That is, deviation in the list information occurring due to the time lag is corrected based on the positional information of the vehicle at the time of reception and the relative position of the target is calculated again based on the position from the vehicle.

Subsequently, the vehicle data control unit 4 generates the real-time map centering on the vehicle using the real-time mapping generation program 35p based on the interest list (step S15).

The vehicle data control unit 4 confirms whether the determination of the danger level has been completed for all the targets according to the danger determination program 36p (step S16). After the danger levels of all the targets are determined (YES in step S16), the process returns to step S13. Conversely, when the determination of the danger level has not been completed (NO in step S16), the danger level of an unprocessed target continues to be determined according to the danger determination program 36p (step S17).

The vehicle data control unit 4 determines danger level 1 in accordance with the relative distance or the relative speed of the vehicle to the target calculated in step S14 according to the danger determination program 36p (step S18). When the danger level exceeds 1 (YES in step S18), the process proceeds to determination of danger level 2 at which the degree of danger is higher (step S19). However, when danger level does not reach 1 in step S18 (NO in step S18), the process returns to step S16. When the danger level does not reach 2 in step S19 (NO in step S19), the vehicle data control unit 4 determines that the danger level is 1 (step S20). At this time, the vehicle data control unit 4 emphasizes the icon of the target on the real-time map according to the emphasis display program 37p and displays the emphasized icon of the target on the display unit. At that time, a target located in a blind spot in which the target is not viewable from the vehicle may also be emphasized to be displayed. In this case, the danger level is determined with reference to the threshold for determining the danger level of the target based on whether the target is located in the blind spot of the vehicle, as illustrated in FIG. 5.

When the danger level is equal to or greater than 2 (YES in step S19), the process proceeds to determine whether the danger level is 3 (step S21). When the danger level does not reach the danger level 3 in step S21 (NO in step S21), the vehicle data control unit 4 determines that the danger level is 2 (step S22). The vehicle data control unit 4 issues a warning signal to the alert unit 11 according to the warning program 38p. The alert unit 11 issues a warning by outputting a sound or light. When the danger level is 3 is step S21 (YES in step S21), the vehicle data control unit 4 determines that the danger level is 3 (step S23). At this time, the vehicle data control unit 4 activates the actuator control unit 12 according to the braking control program 39. The actuator control unit 12 brakes the vehicle. Thereafter, the process returns to step S13. The processes from steps S1 to S7 and the processes from steps S13 to S21 may be executed in parallel.

The monitoring area A at time T1 illustrated in FIG. 7 will be considered.

In step S13, the communication devices 9 of the vehicles a to c first acquire the interest list from the server 20. In step S14, the vehicle data control unit 4 of each vehicle executes relative conversion on the target information in the interest list to a position appropriate from a vehicle (referred to as a monitoring vehicle) that is monitoring other vehicles. Since the coordinates of the target acquired from each vehicle are relative coordinates from the acquired vehicle at the time of the interest list, the coordinates of the target may be converted into coordinates centering on the vehicle receiving the interest list. The vehicle data control unit 4 calculates the relative distance or the relative speed from the converted coordinates or the like.

In the following example, the vehicle c is assumed to be the monitoring vehicle. A time in which the vehicle c transmits the list information to the server 20 and the vehicle c receives the interest list from the server 20 is assumed to be $\Delta T$.

For example, as in FIGS. 10A to 10C, the vehicle c is assumed to have driving information of a direction $Dc1$, a speed $Vc1$, and acceleration $\alpha c1$ at a position $(Xc1, Yc1)$ at time T1. The vehicle c is assumed to have target information of the bicycle d that has a position $(Xc11, Yc11)$, a direction $Dc11$, a speed $Vc11$, and acceleration $\alpha c11$, target information of the pedestrian e who have a position $(Xc12, Yc12)$, a direction $Dc12$, a speed $Vc12$, and acceleration $\alpha c12$, and target information of the pedestrian f who have a position $(Xc13, Yc13)$, a direction $Dc13$, a speed $Vc13$, and acceleration $\alpha c13$. The vehicle c transmits the target information as the list information to the server 20 of the server system 2. The server data control unit 21 of the server 20 sums the list information from the different vehicles to generate the interest list illustrated in FIG. 12. At this time, for the same target, the positional information is added to be summed so that the positional information is not duplicated in the interest list. The server 20 transmits the interest list to the vehicle c and a time at which the vehicle c receives the interest list from the server 20 is $T1+\Delta T$. At this time, because of the list information regarding the original time T1, deviation occurs in a value of the interest list by $\Delta T$. However, by comparing a position $(Xc1+\Delta Xc1, Yc1+\Delta Yc1)$ or a direction of the vehicle and the values of the speed and acceleration at $T1+\Delta T$ to the values at time T1, it is possible to calculate how much deviation occurs during $\Delta T$. Therefore, it is possible to adjust the deviation in the information in the interest list.

Even time deviation is corrected, coordinates of the vehicle a are not appropriate in the interest list information illustrated in FIG. 12. Therefore, for example, the vehicle data control unit 4 of the vehicle a calculates the coordinates $(Xac12, Yac12)$ of the pedestrian e seeing the vehicle a from the coordinates $(Xc1, Yc1)$ of the vehicle c acquiring the targets and the coordinates $(Xc12, Yc12)$ of the pedestrian e on the interest list. The vehicle data control unit 4 of the vehicle a further calculates a distance between the vehicle a and the pedestrian e from the calculated coordinates.

Generating Real-time Map

In step S15, the vehicle data control unit 4 generates the real-time map centering on the vehicle. The generated real-time map is displayed on the display unit 10 of each vehicle. For example, a target on the real-time map may be displayed with only an icon on the display unit 10. Here, the generation of the real-time map will be described with reference to FIGS. 13 and 14.

Figure 13:
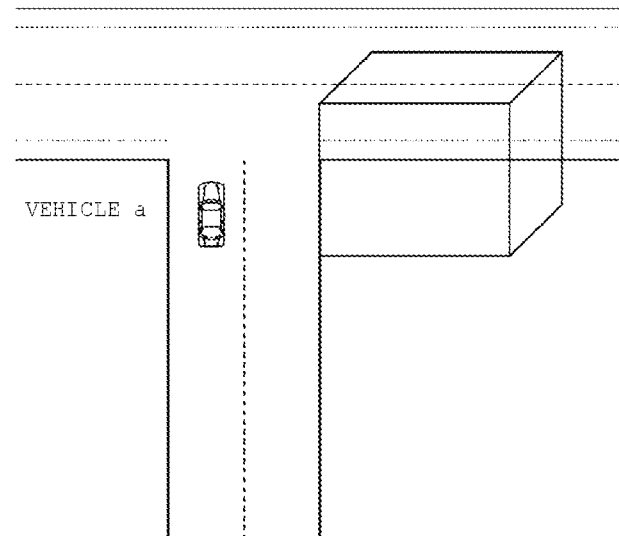
FIG. 13 is a top view of example visual information of a vehicle at a time T1+ΔT.
Figure 14A:
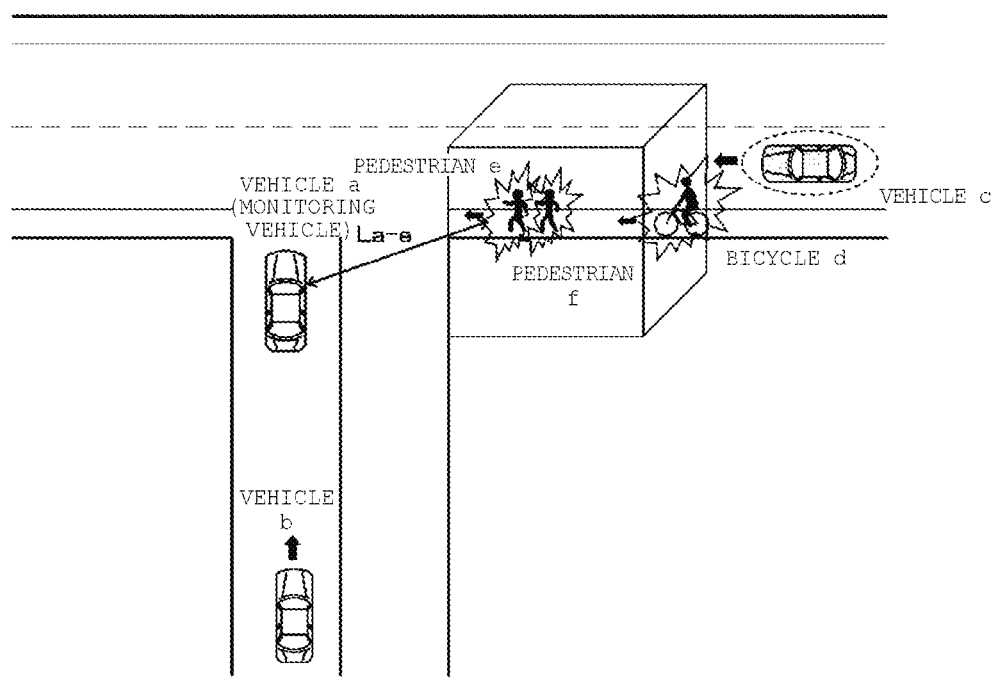
FIGS. 14A, 14B, and 14C depict real-time maps displayed on a display unit of the vehicles, respectively, at the time T1+ΔT.

FIG. 13 is a top view of example visual information of the vehicle a at time $T1+\Delta T$. In FIG. 13, the vehicle b, the vehicle c, the bicycle d, the pedestrian e, and the pedestrian f are not displayed. FIG. 14A depicts a real-time map displayed on the display unit of vehicle a at time $T1+\Delta T$. The vehicle data control unit 4 executes mapping based on the target subjected to the relative conversion in step S14. Thus, targets which may not be seen due to an obstacle such as a building can also be displayed on the real-time map based on information from the server 20. The generated real-time map is updated by repeating each step.

Figure 14B:
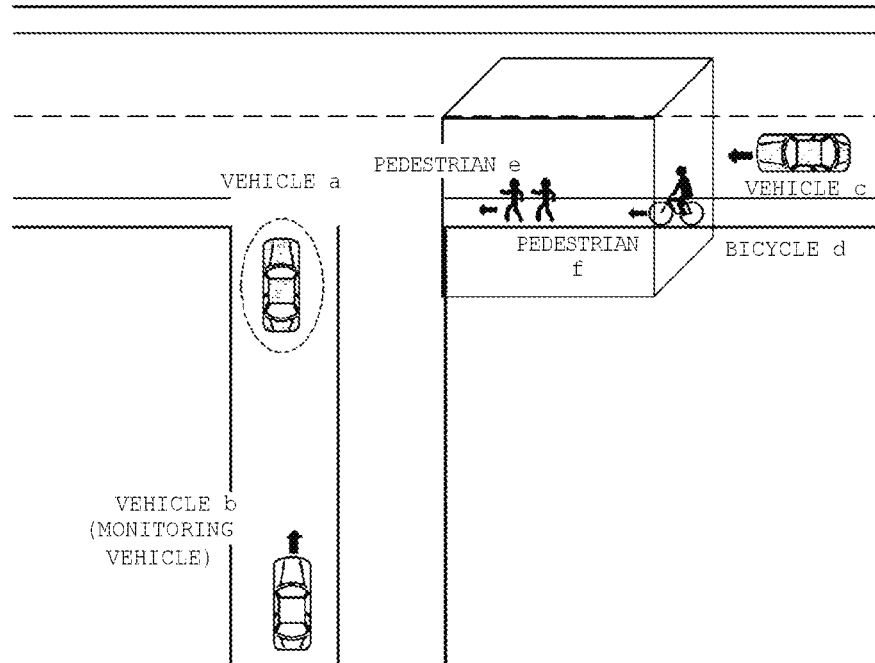
Figure 14C:
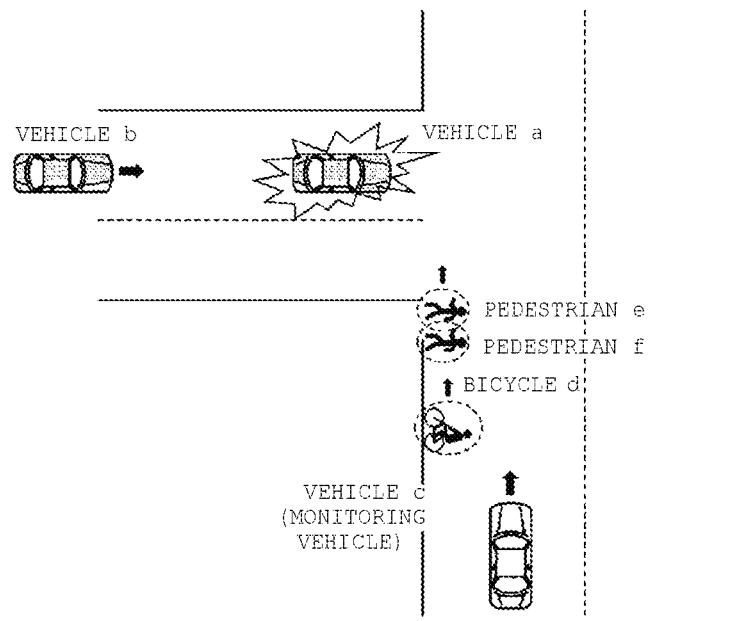

FIGS. 14B and 14C depict an example real-time map displayed on the display unit of the vehicle b and an example real-time map displayed on the display unit of the vehicle c at time $T1+\Delta T$, respectively. Even the targets which may not be seen from a monitoring vehicle are displayed on each of the real-time maps.

Determining Danger Level

The vehicle data control unit 4 of each vehicle sets a danger level of each target displayed on the real-time map according to the road division information during driving included in the interest list and the danger determination program 36p. The danger level is determined, for example, in accordance with the table of FIGS. 5A and 5B corresponding to danger level 1 as described above. Although not illustrated, danger levels 2 and 3 are determined in accordance with the tables of danger levels 2 and 3 equivalent to FIGS. 5A and 5B. Here, the vehicle data control unit 4 takes action for each danger level as follows. At danger level 1, the vehicle data control unit 4 emphasizes and displays icons on the real-time map. At danger level 2, the vehicle data control unit 4 gives a warning to the driver of the vehicle. At danger level 3, the vehicle data control unit 4 controls driving of the vehicle. When it is determined in step S16 that the danger levels of all the targets on the interest list are determined, the process returns to step S13 to repeat each step again.

Danger Level 1

FIGS. 14A to 14C are diagrams illustrating the real-time maps displayed on the display units 10 of the vehicles a to c at time T1+ΔT. ΔT indicates a time lag occurring at the time of communication.

First, as illustrated in FIG. 14A, the real-time map at time T1+ΔT is displayed on the display unit 10 of the vehicle a. On the real-time map, pedestrians and vehicles unrecognizable due to an obstacle such as a building are also displayed.

when the targets are determined to be at danger level 1 according to the danger determination program 36p, the vehicle data control unit 4 emphasizes and displays icons according to the emphasis display program 37p.

For example, a case in which a distance La-e between the vehicle a and the pedestrian e illustrated in FIG. 14A is equal to or less than a threshold Xp1b_a1 illustrated in FIG. 5 will be considered. In step S18, the vehicle data control unit 4 of the vehicle a determines that the danger level of the pedestrian e is equal to or greater than 1 with reference to the tables of FIGS. 5A and 5B. Subsequently, when the vehicle data control unit 4 of the vehicle a determines in step S19 that the danger level of the pedestrian e is not equal to or greater than 2, the vehicle data control unit 4 of the vehicle a determines that the danger level of the pedestrian e is 1.

In step S20, the vehicle data control unit 4 of the vehicle a emphasizes the icon of the pedestrian e on the real-time map displayed on the display unit 10. The determination of the danger level in accordance with a distance has been described above, but the danger level may be determined in accordance with a speed difference between the vehicle a and the pedestrian e. The danger level may be determined when both the conditions are satisfied. In either case, when danger level 1 is determined, the icon of the pedestrian e is emphasized and displayed on the display unit 10 of the vehicle a. As illustrated in FIG. 14A, when danger level 1 is determined similarly for the vehicle c, the bicycle d, the pedestrian e, and the pedestrian f, each icon on the real-time map of the vehicle a is emphasized and displayed.

Here, the emphasis of the icon is displayed with a figure such as a circle centering on the icon, but the radius or the size of the figure is assumed to be changed according to the target. That is, when a person, a bicycle, a motorcycle, a vehicle, or the like requires attention, the radius or the shape of the figure may be different. The radius or the shape of the figure may be changed in accordance with a speed of a vehicle or a road type, such as a highway, a national road, an urban area, or the like on which the vehicle is traveling. When several moving targets are displayed, for example, the number of displayed moving targets and the sizes of the icons can be adjusted. Further, the target located in a blind spot in the vehicle may be emphasized and displayed in a blinking manner. In FIG. 14A to 17C, the icons are emphasized using circles for vehicles and figures for the bicycle and pedestrians different from the circles.

Figure 15:
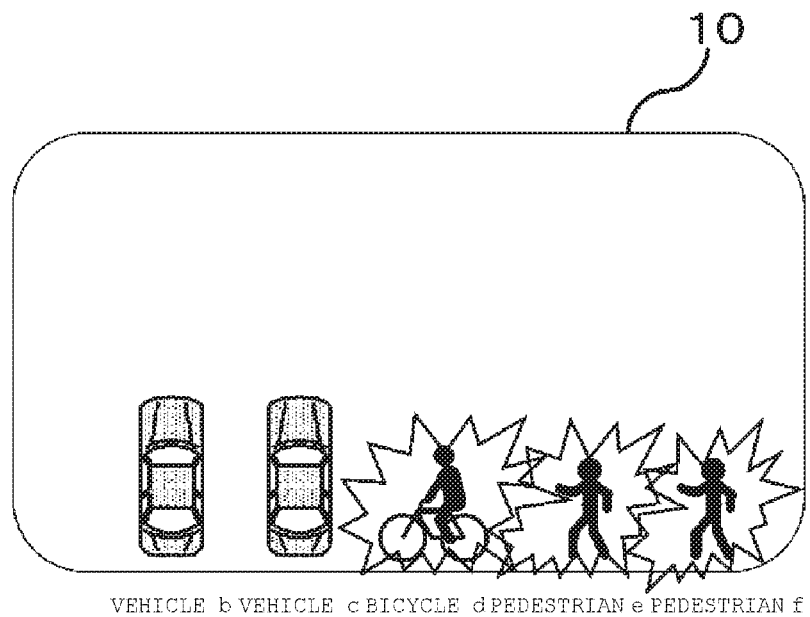
FIG. 15 depicts example icons displayed on a display unit of the vehicle in FIG. 14A.

As illustrated in FIG. 15, only the icons of the targets may be displayed on the display unit 10 and the icons of the targets at danger level 1 may be emphasized and displayed.

Subsequently, as illustrated in FIG. 14B, the pedestrians or the vehicles undetected due to the obstacle such as a building are also displayed on the display unit 10 of the vehicle b similarly to the vehicle a. The vehicle data control unit 4 of the vehicle b emphasizes and displays the icon of the vehicle a determined to be at danger level 1. However, the icon of the pedestrian e not corresponding to danger level 1 is not emphasized or displayed.

As illustrated in FIG. 14C, the pedestrians or the vehicles undetected due to the obstacle such as a building are also displayed on the display unit 10 of the vehicle c similarly to the vehicle a. In the example of FIG. 14C, the vehicle data control unit 4 of the vehicle c determines that the vehicle a, the bicycle d, the pedestrian e, and the pedestrian f are at danger level 1 and emphases the display icons. In FIG. 14C, the pedestrians or the bicycle and the vehicles are emphasized using different figures.

When the vehicle data control unit 4 determines in step S22 that the danger level is 2, the vehicle data control unit 4 transmits a command to the alert unit 11 according to the warning program 38p. The alert unit 11 outputs a warning to inform the driver of a danger.

Figure 16:
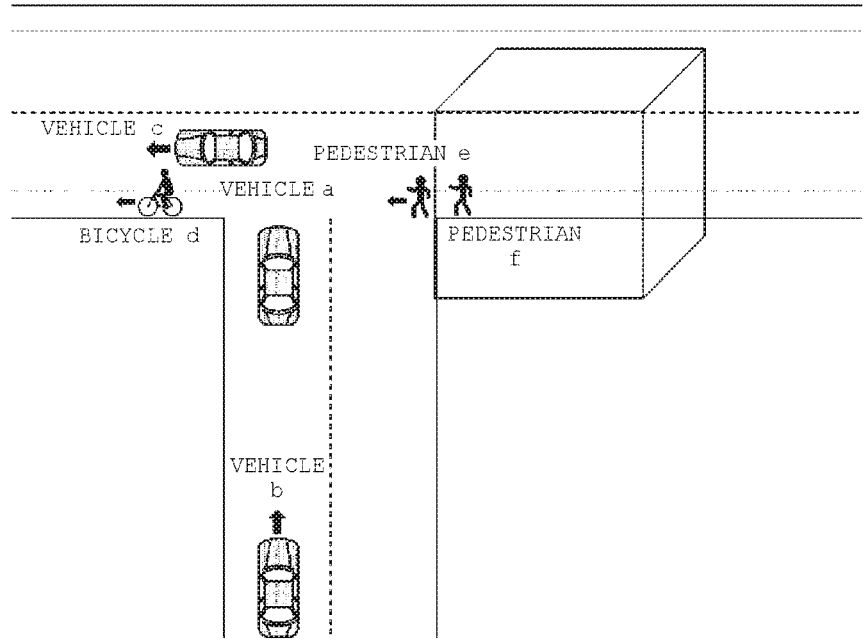
FIG. 16 is a top view of a monitoring area at another time T2.
Figure 17A:
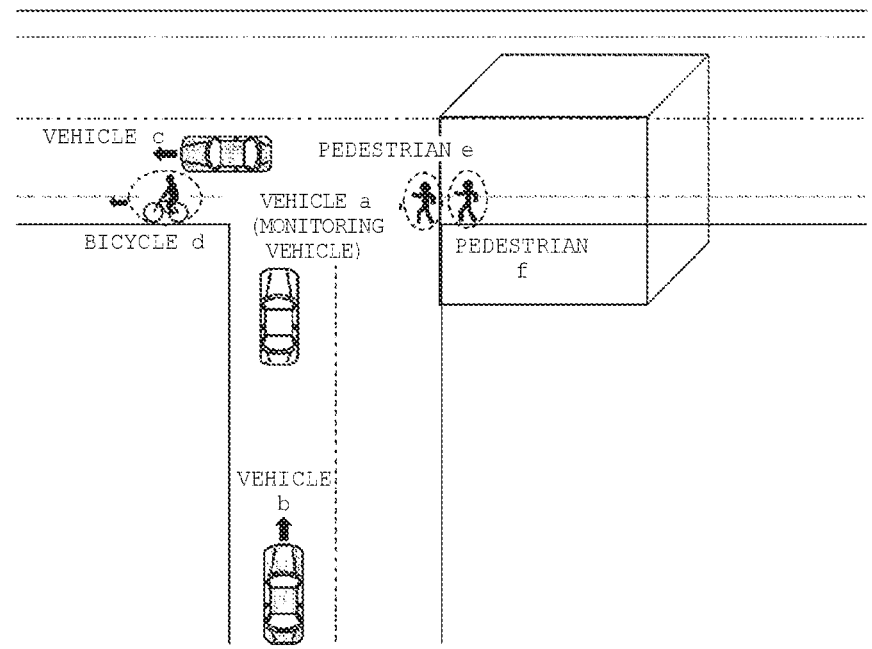
FIGS. 17A, 17B, and 17C depict real-time maps displayed on a display unit of vehicles, respectively, at a time T2+ΔT.
Figure 17B:
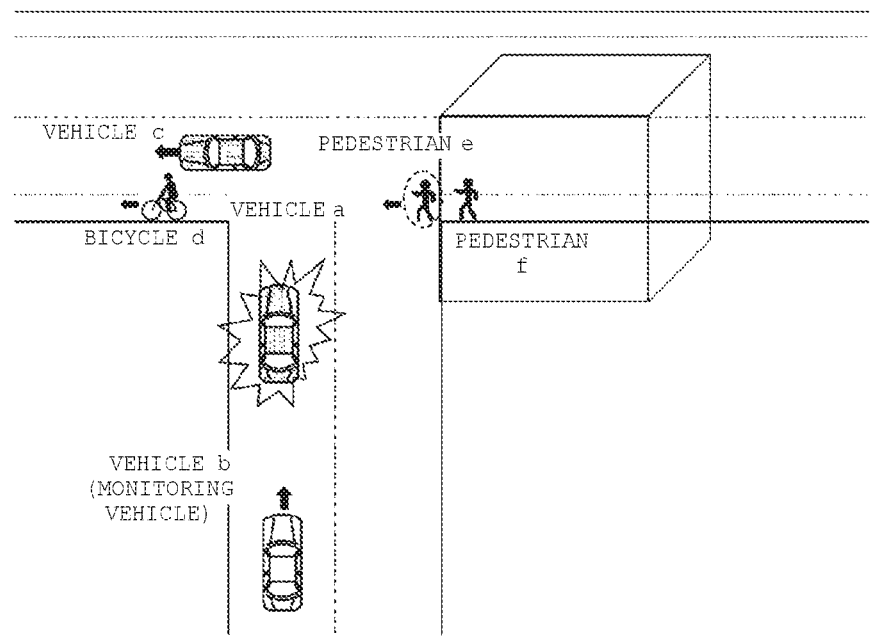
Figure 17C:
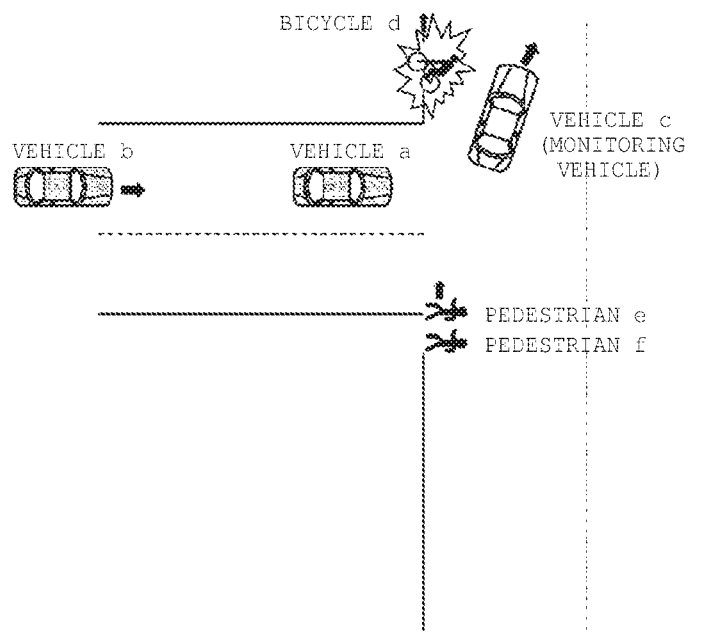

FIG. 16 is a top view of the monitoring area A at time T2 after time T1. FIGS. 17A to 17C depict example screens on the display units 10 of the vehicles a to c at time T2+ΔT. ΔT indicates a time lag occurring at the time of communication and is assumed to be negligible compared to T2.

First, as illustrated in FIG. 17A, targets which may not be seen at time T1 can be seen on the display unit 10 of the vehicle a at time T2+ΔT. Similarly to at time T1, the icons of the pedestrians or the vehicles that are still undetected due to the obstacle such as a building are also displayed on the real-time map. When the targets are determined to be at danger level 1, the display icons are emphasized and displayed according to the emphasis display program 37p. In FIG. 17A, the bicycle d and the pedestrian e are emphasized and displayed.

Danger Level 2

As illustrated in FIG. 17B, the real-time map is displayed on the display unit 10 of the vehicle b similarly to the vehicle a. For example, in FIG. 17B, it is assumed that the vehicle b approaches the vehicle a and the vehicle data control unit 4 of the vehicle b determines that the vehicle a is at danger level 2 according to the danger determination program 36p. In this case, the vehicle data control unit 4 transmits a command to the alert unit 11 according to the warning program 38p. The alert unit 11 of the vehicle b issues a warning to the driver of the vehicle b by a sound so that the driver can avoid collision with the vehicle a.

Danger Level 3

As illustrated in FIG. 17C, the real-time map is similarly displayed on the display unit 10 of the vehicle c. The vehicles a and b may not be seen in traveling from the vehicle c. However, since each vehicle regularly transmits a current position of the vehicle to the server 20, the vehicle c can acquire information regarding the other vehicles until the monitoring area to which the vehicle c belongs is changed. Thus, the driver does not abruptly lose information regarding other the vehicles.

For example, in FIG. 17C, it is assumed that the vehicle c approaches the bicycle d and the vehicle data control unit 4 of the vehicle c determines that the bicycle d is at danger level 3 according to the danger determination program 36p.

The vehicle data control unit 4 transmits a command the actuator control unit 12 according to the braking control program 39p. The actuator control unit 12 of the vehicle c automatically operates devices such as a handle, a brake, an airbag, and the like mounted on the vehicle. Thus, it is possible to prevent the vehicle c from colliding with the bicycle d.

In this way, the interest list is shared in the monitoring area, but the real-time map displayed on the display unit 10 differs for each vehicle. The real-time map is regularly updated in accordance with the interest list transmitted from the server 20.

The pedestrian f displayed from FIG. 17A to 17C is unrecognizable from any vehicle. However, the pedestrian f can be detected to be shared between areas by installing the image capturing unit 3 on the rear side of the vehicle or utilizing a curve mirror installed on a road or an apparatus on which a device is mounted.

Operational Effect and Advantages

In the vehicle and the driving support system including the vehicle according to the first embodiment, the vehicle extracts a target from an image acquired from the image capturing unit 3 and information regarding the target that is shared between a plurality of vehicles in the same monitoring area. Each vehicle can generate a real-time map in consideration of the degree of danger of the target based on the shared information. Thus, a target which may not be seen from the vehicle can be detected on the real-time map. Since the captured image is shared in accordance with information regarding the target and driving information of the vehicle rather than being simply combined and shared, only necessary information for a specific vehicle may be processed and danger can be easily detected.

Second Embodiment

A driving support system according to a second embodiment will be described with reference to FIGS. 18 to 21. The same reference numerals are used for the components that are substantially the same as those of the first embodiment, and the detailed description of repeated components may be omitted. In the second embodiment, the list information is transmitted and received between the vehicles. That is, each vehicle shares each piece of list information without the server 2.

Figure 18:
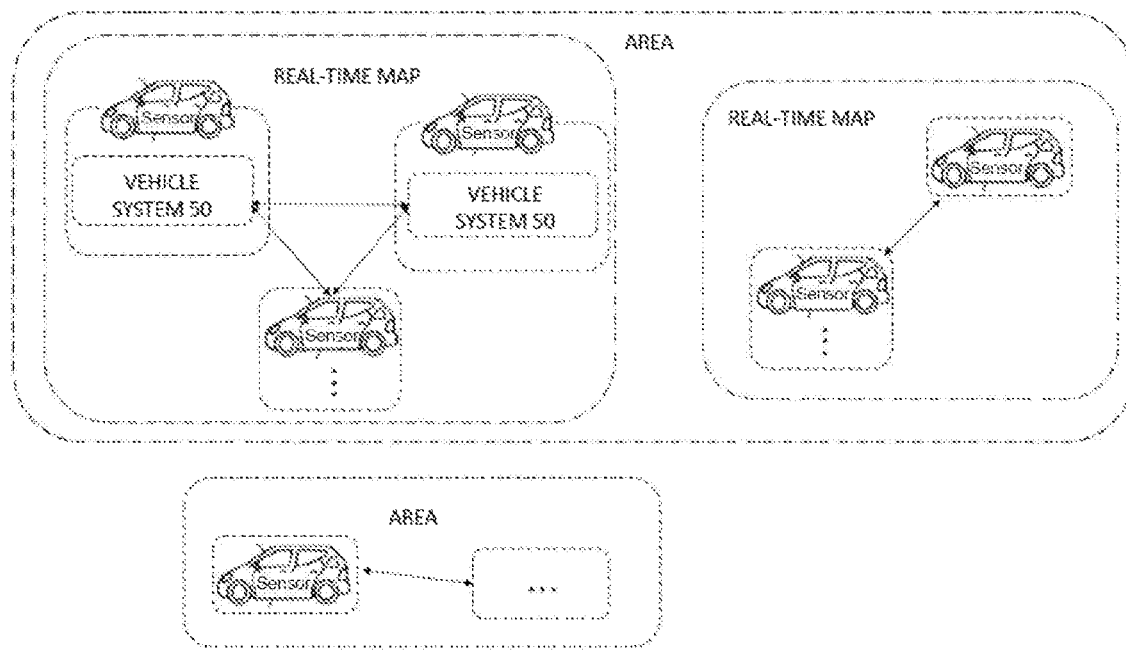
FIG. 18 depicts an overall configuration of a driving support system according to a second embodiment.
Figure 19:
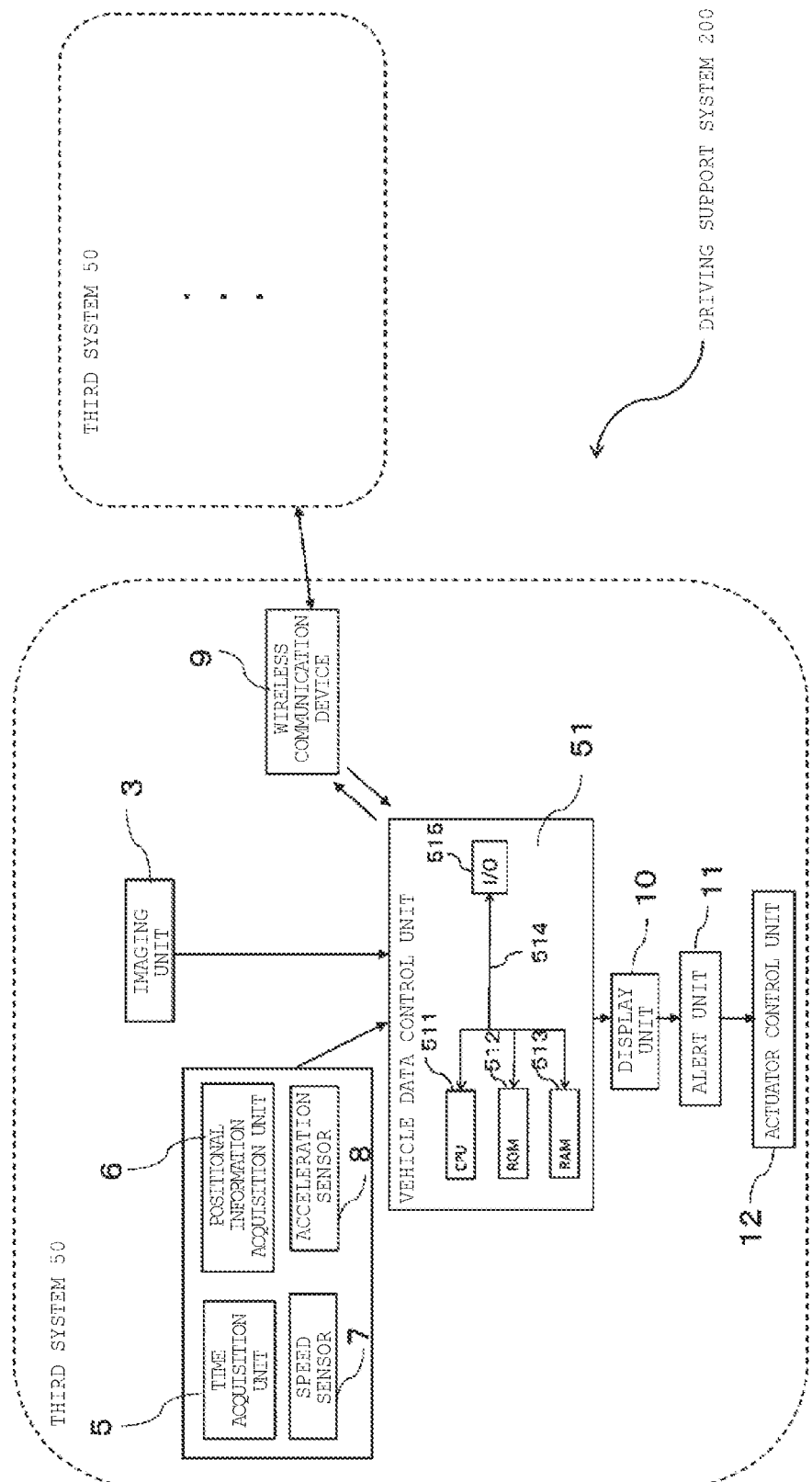
FIG. 19 is a block diagram of a driving support system according to the second embodiment.

FIG. 18 depicts an overall configuration of a driving support system 200 according to the second embodiment. As illustrated in FIG. 18, the driving support system 200 includes a plurality of monitoring systems 50. As illustrated in FIG. 19, the monitoring system 50 includes an image capturing unit 3, a data control unit 51, a time acquisition unit 5, a positional information acquisition unit 6, a speed sensor 7, an acceleration sensor 8, a wireless communication device 9, a display unit 10, an alert unit 11, and an actuator control unit 12.

In the second embodiment, the list information is directly transmitted and received between a plurality of vehicles belonging to the same monitoring area. That is, each vehicle executes the processes that are to be executed by the server system 2 according to the first embodiment. The vehicle data control unit 51 executes the processes of the programs executed by the server data control unit 21.

Differences between the driving support systems 200 and 100 will be described with reference to FIGS. 20A and 20B.

Figure 20A:
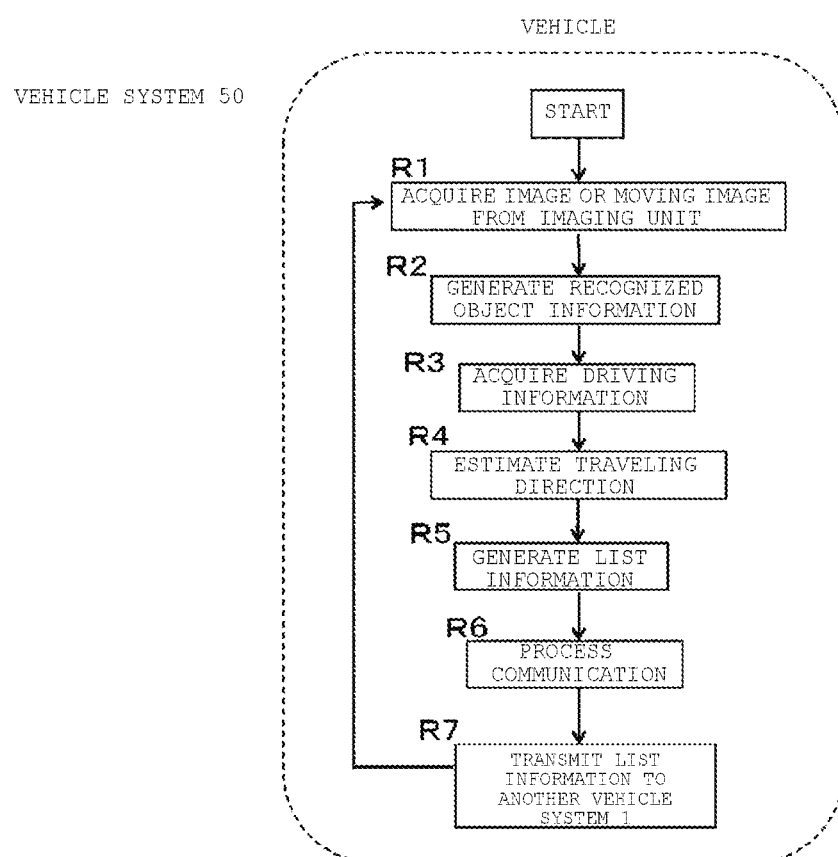
FIGS. 20A and 20B are flowcharts of a monitoring system.
Figure 20B:
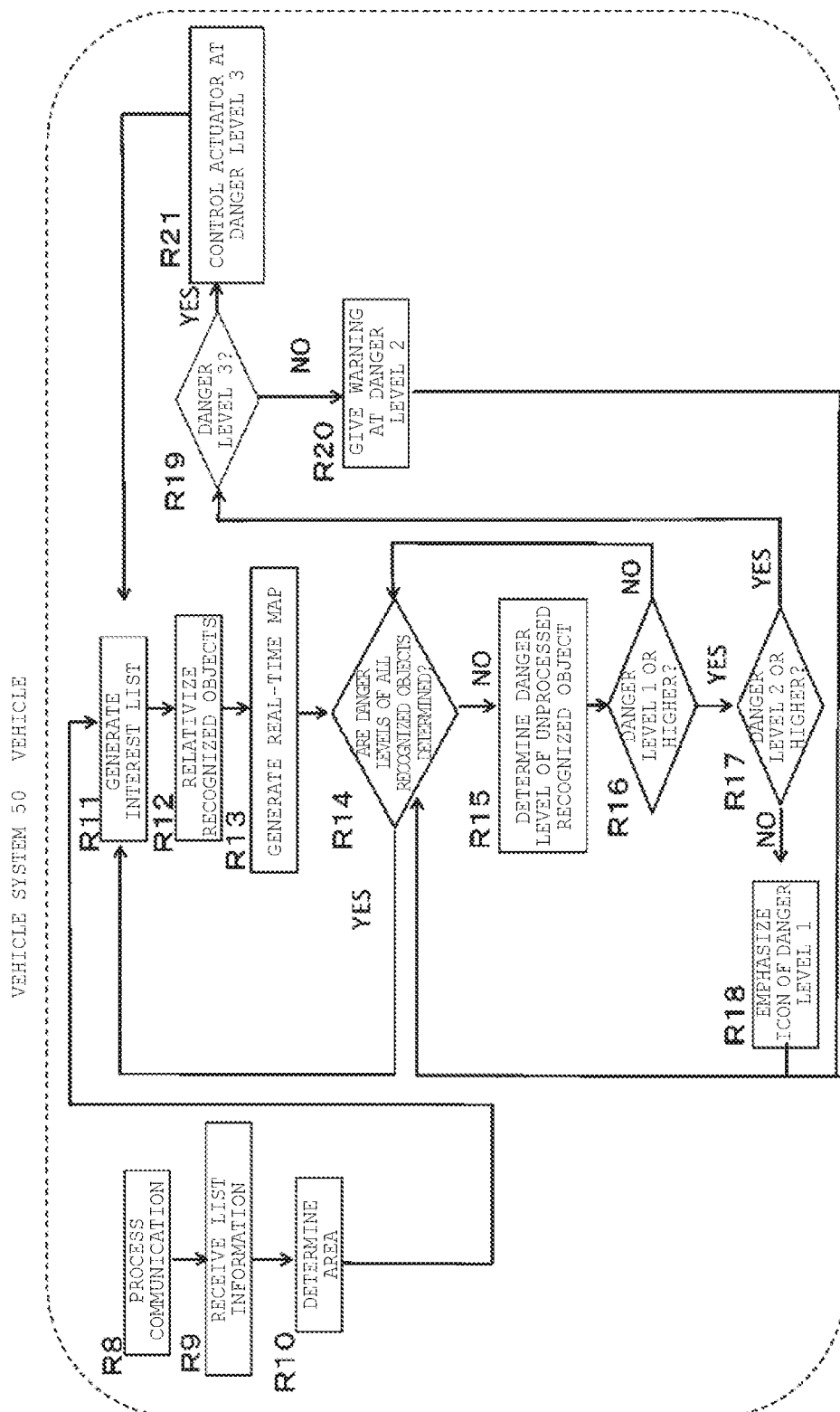
Figure 21:
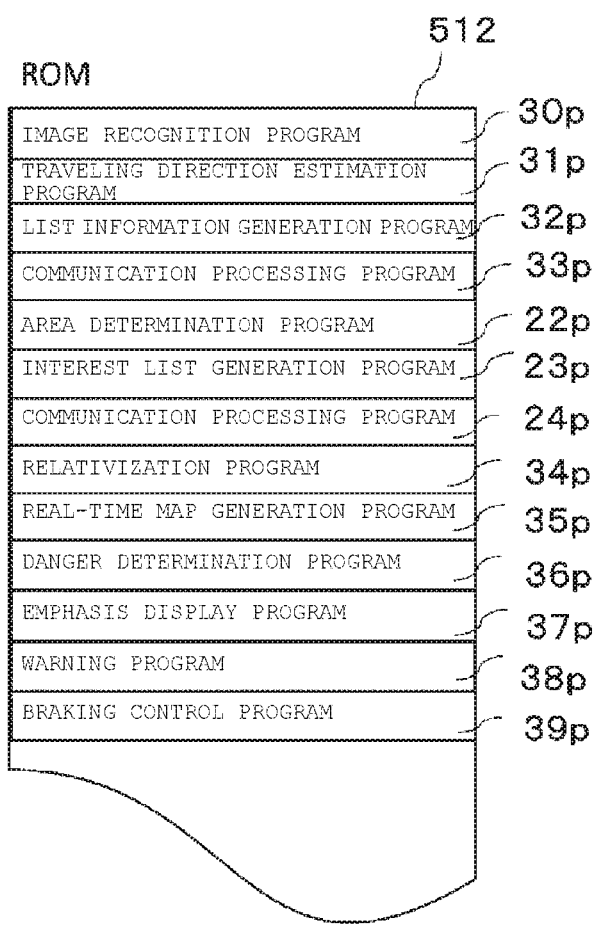
FIG. 21 is a schematic diagram of a storage region of a ROM.

As illustrated in FIGS. 20A and 20B, the monitoring system 50 executes an operation from steps R1 to R21. Processes of steps R1 to R7 illustrated in FIG. 20A and processes of steps R8 to R21 illustrated in FIG. 20B may be generally executed in parallel. The processes executed in the server system 2 in the driving support system 100 are equivalent to steps R8 to R11 of the driving support system 200 illustrated in FIG. 20B. FIG. 21 is a schematic diagram of a storage region of a ROM 512.

The vehicle data control unit 51 of the vehicle generates an interest list with reference to the list information transmitted from another vehicle in the monitoring area. The process is the same as the process of the server 20 of the server system 2 according to the first embodiment. At this time, for the same target, the positional information is added to be summed so that the positional information is not duplicated in the interest list. Thereafter, the targets are relativized from the generated interest list to generate a real-time map. This process is the same as the process of the vehicle system 1 according to the first embodiment.

By executing the communication between the vehicles without an intervening server, it is possible to accelerate a processing speed. As a communication between vehicles, a spread spectrum communication scheme having a narrow frequency bandwidth thus being resistant to noise or radio wave interference or the like may be adopted.

Third Embodiment

Figure 22:
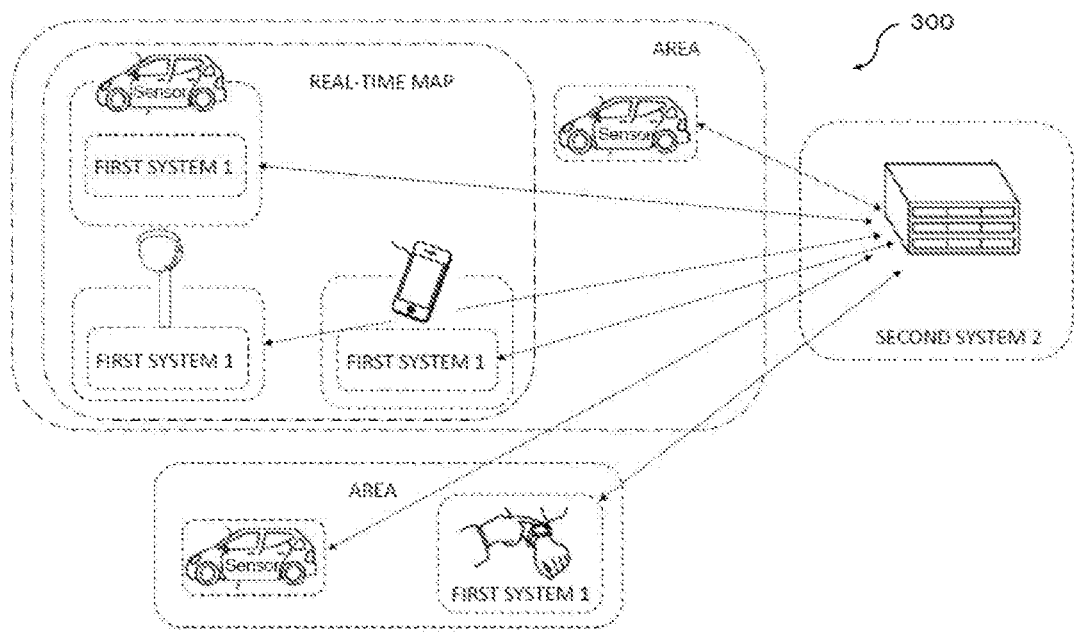
FIG. 22 depicts an overall configuration of a driving support system according to a third embodiment.
Figure 23:
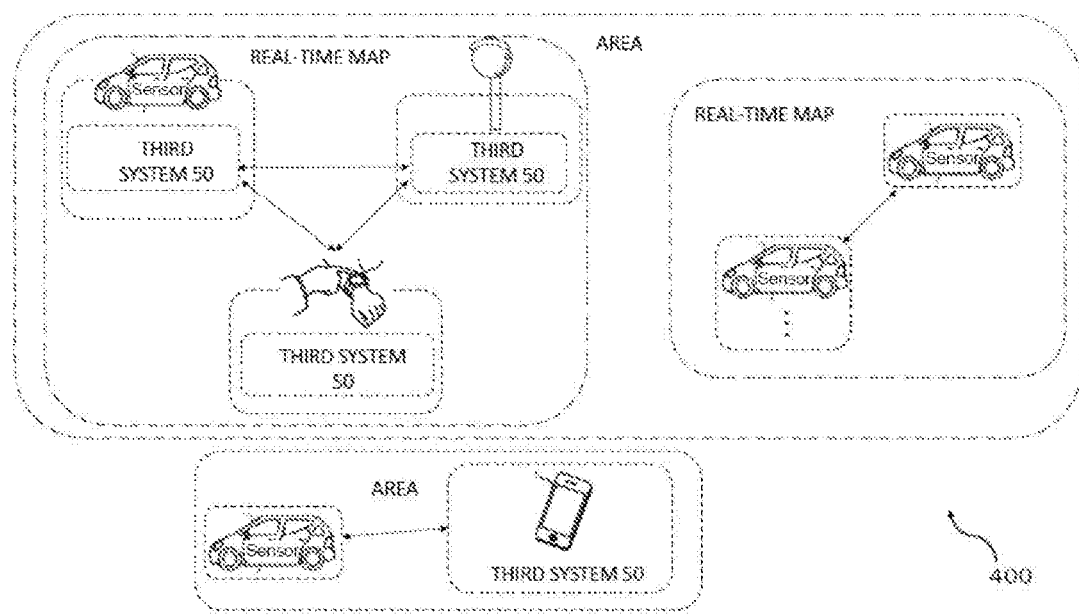
FIG. 23 depicts an overall configuration of a driving support system according to a fourth embodiment.

A driving support system 300 according to a third embodiment will be described with reference to FIGS. 22-25. The same reference numerals are used for the components that are substantially the same as those of the first embodiment, and the detailed description of repeated components may be omitted. In the third embodiment, monitoring system are not limited to a vehicle system that is mounted on a vehicle and one or more of monitoring systems are mounted in a device such as a smartphone, a computer, a timepiece, or glasses carried by a person, in addition to a vehicle. A beacon or the like installed on a robot, a poll or a wall, or a road is assumed to serve as the monitoring systems according the first and the second embodiments. FIG. 22 depicts an overall configuration of a driving support system 300 according to the third embodiment. As illustrated in FIGS. 22 and 23, the driving support system 300 includes a plurality of monitoring systems 1, including a vehicle system on a vehicle, and the server system 2.

Figure 24:
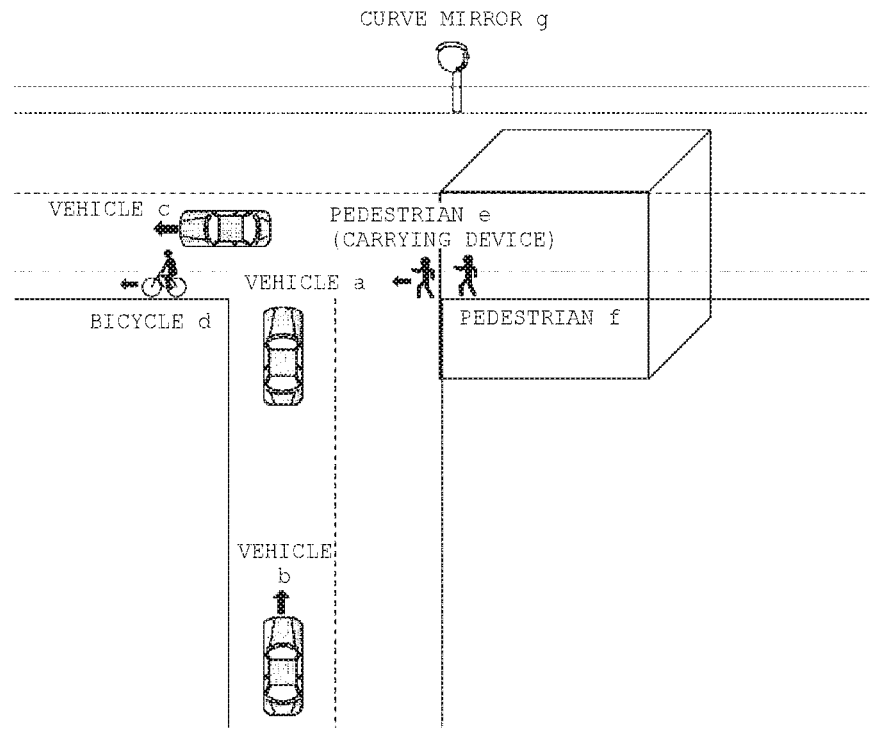
FIG. 24 is a top view of a monitoring area including a curve mirror and a person carrying a device at time T2.

FIG. 24 is a top view of the monitoring area A at time T2. In this example, the pedestrian e carries a device terminal, such as a mobile phone, which is a monitoring system 1 and a curve mirror g is also a monitoring system 1.

The pedestrian e and the curve mirror g operate in accordance with an example of the flowchart of the vehicle systems (referred to as monitoring systems in the third embodiment) and server systems illustrated in FIGS. 6A to 6C.

An operation of the driving support system 300 is the same as that of the driving support systems 100 and 200. In the driving support system 300, all the monitoring systems may not receive the list information and the interest list.

Figure 25:
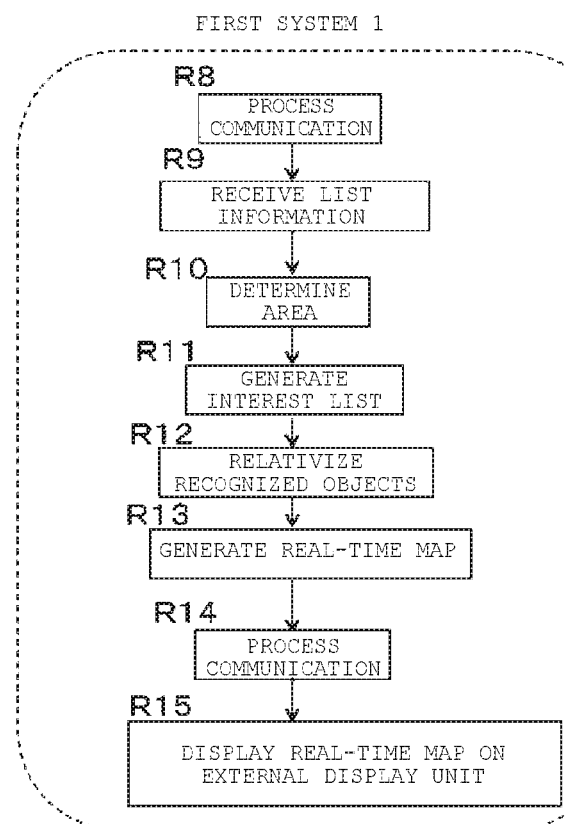
FIG. 25 is a flowchart of a vehicle system of a driving support system corresponding to FIG. 20B.

For example, when one of the monitoring systems 1 is, for example, the curve mirror g installed on a communication road in FIG. 24, the list information and the interest list may be not received by the curve mirror g to generate a real-time map. In this case, the data control unit 4 of the curve mirror g may not execute the processes of steps S13 to S23 illustrated in FIG. 6B and the processes of steps R8 to R21 illustrated in FIG. 20B. As illustrated in FIG. 25, the data control unit 4 of the curve mirror g may not determine a danger level after generating a real-time map and may display the real-time map on a display unit of another external device through the processes of steps R8 to R15 instead of the steps illustrated in FIG. 6B.

When the pedestrian e carries, for example, a device which is the monitoring system 50 in FIG. 24, the data control unit 4 of the device transmits the list information for which information regarding the targets is not input to the server system 2. However, when the device includes the image capturing unit 3, the device may be handled as in the vehicles of the driving support systems 100 and 200. In actuator control, collision is avoided through vibration or the like of the terminal instead of operating a device such as a handle, a brake, an airbag, or the like mounted on the vehicle. Thus, it is possible to prevent a collision of a pedestrian or the like with the vehicle or the target.

By utilizing a peripheral device other than the vehicle or public equipment to share more accurate information, it is possible to generate a real-time map with high precision. That is, the real-time map can be generated even when a narrow road for vehicle passage or traveling on the road may not be executed due to an obstacle. Even other than a vehicle, it is possible to detect danger such as collision and urge a pedestrian to avoid the danger by the driving support system 300.

Fourth Embodiment

A driving support system 400 according to a fourth embodiment will be described with reference to FIG. 26A and 26B. The same reference numerals are used for the components that are substantially the same as those of the first embodiment, and the detailed description of repeated components may be omitted. In the fourth embodiment, a vehicle belonging to another monitoring area can acquire road traffic information by receiving a real-time map generated in vehicle system and other monitoring systems or the interest list generated in the server system and monitoring systems. By receiving the interest list information generated in the server system and monitoring systems, it is possible to acquire traffic information from even a vehicle located in another monitoring area.

Figure 26A:
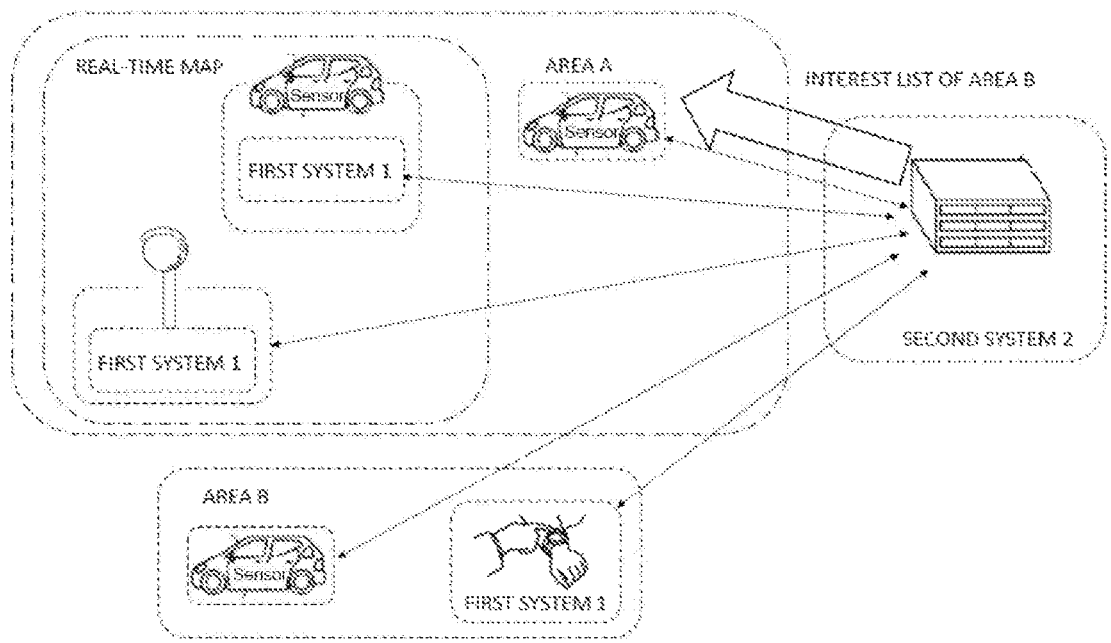
FIGS. 26A and 26B depict overall configurations of a driving support system according to a fourth embodiment.
Figure 26B:
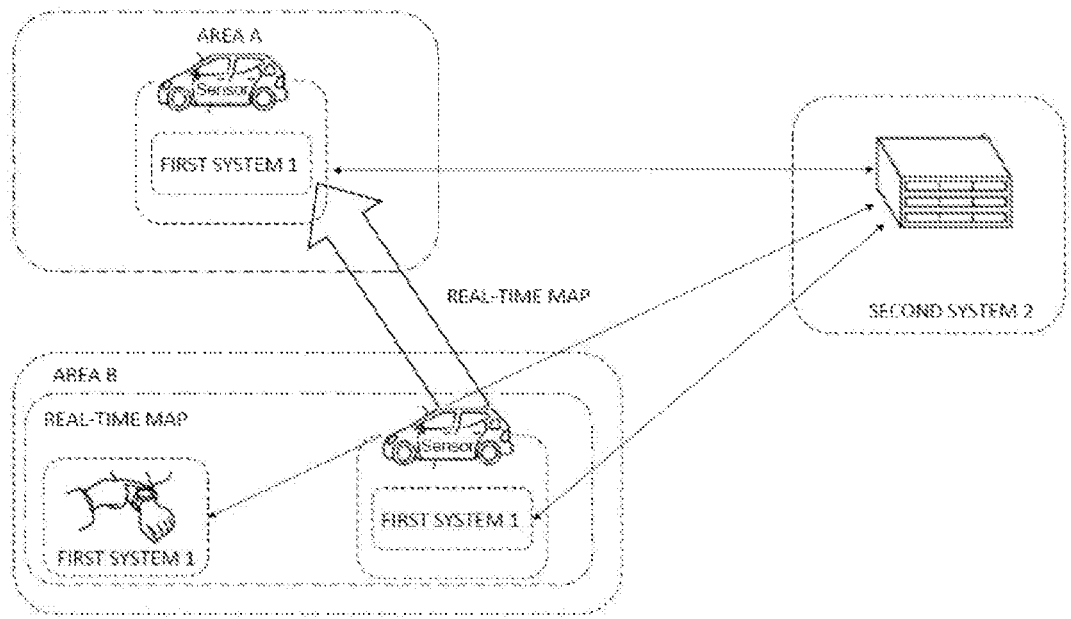

FIGS. 26A and 26B depict an overall configuration of the driving support system 400 according to the fourth embodiment. In FIG. 26A, the vehicle data control unit 4 of a vehicle belonging to the monitoring area A accesses the server 20 to acquire interest lists corresponding to the monitoring area B. An amount of traffic such as vehicles or pedestrians can be acquired from the interest lists. As illustrated in FIG. 26B, a vehicle in the monitoring area A may directly receive the interest list or the real-time map generated by a vehicle belonging to the monitoring area B.

By detecting road congestion, accident information, or the like in real time, it is possible to execute route searching quickly and accurately to avoid congestion. Further, since information regarding the pedestrians other than the vehicles can be detected together, a road having less potential danger can be selected to drive the vehicle.

Fifth Embodiment

A driving support system 500 according to a fifth embodiment will be described with reference to FIGS. 27 and 28. The same reference numerals are used for the components that are substantially the same as those of the first embodiment, and the detailed description of repeated components may be omitted. In the fourth embodiment, weather information of another monitoring area can be acquired by receiving the real-time map generated in the vehicle system and other monitoring systems or the interest list generated in the server system and monitoring systems in the other area.

The monitoring system 50 of a vehicle (also referred to as a vehicle system) in the driving support system 500 acquires weather information in a monitoring area to which the vehicle belongs from image or moving image information acquired from the image capturing unit 3. By adding the weather information to the list information, a server, a vehicle belonging to another monitoring area, or the like can acquire the weather information.

Figures 27, 28:
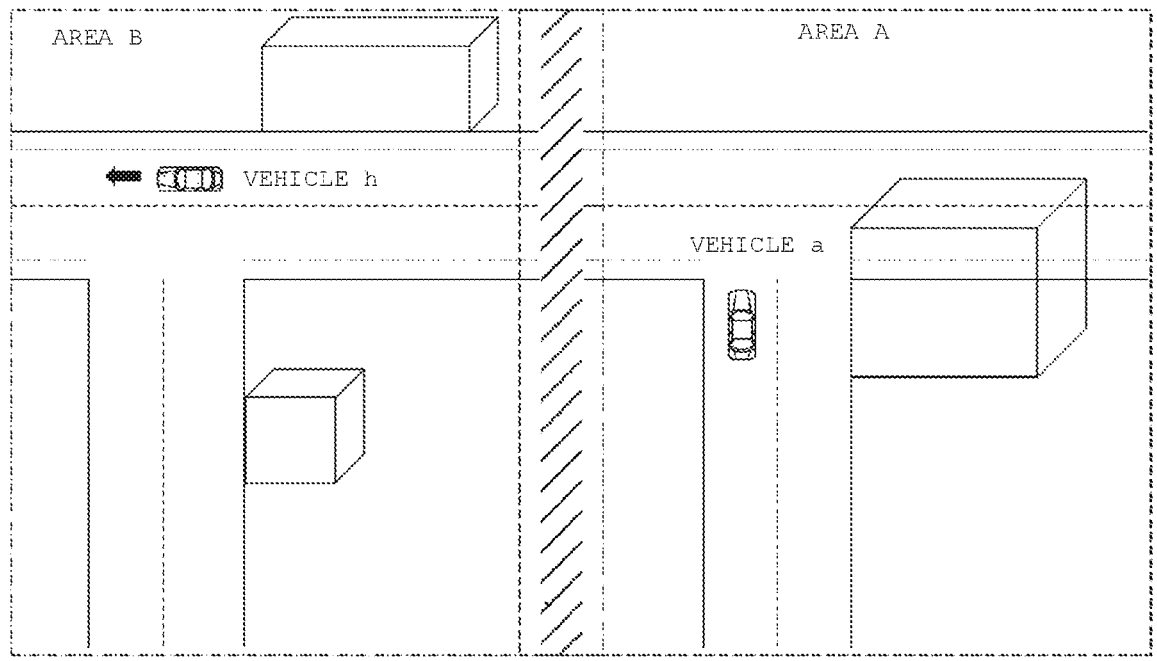
FIG. 27 is a top view of monitoring areas A and B at time T3.
FIG. 28 depicts example list information of a vehicle.

FIG. 27 is a top view of the monitoring areas A and B. In FIG. 27, the monitoring areas A and B are adjacent to each other and diagonal lines indicate an overlapping portion. In FIG. 27, it is assumed that it is snowing in the monitoring area B. At this time, the vehicle data control unit 4 or the vehicle data control unit 51 of a vehicle h belonging to the monitoring area B determines that it is snowing in the monitoring area B from image or moving image information acquired from the image capturing unit 3. The vehicle data control unit 4 or the data control unit 51 adds the weather information to the list information of the vehicle h as in an example illustrated in FIG. 28 and transmits the list information to the server system 2 or other vehicles belonging to other areas. The vehicle system and the other monitoring systems of the driving support system 500 may include a thermometer or a hygrometer so that information such as temperature or humidity may be included in the list information.

Similarly to the first to fourth embodiments, the vehicle a belonging to the monitoring area A can communicate with the server system 2 or the vehicle h belonging to the monitoring area B to acquire the weather information of the monitoring area B in real time. Thus, it is possible to acquire conditions of a destination or a road and it is possible to enable safer and comfortable driving.

While certain embodiments and modification examples have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving support system, comprising:
   a first monitoring device on a first object, the first monitoring device having a first controller, a first camera, and a first display;
   a second monitoring device on a second object, the second monitoring device having a second controller and a second camera; and
   a server in communication with the first and second monitoring devices,
   wherein the first and second controllers are each configured to:
      detect a target in images acquired from the respective first or second camera; and
      transmit target information based on the images to the server, wherein the server is configured to:

generate list information including the target information from the first and second monitoring devices; and transmit the list information to the first monitoring device when the first object is within a first monitoring area, and wherein the first controller is further configured to:
generate a map according to the list information received from the server; and
display the map on the first display.

2. The driving support system according to claim 1, wherein the first object is a vehicle.

3. The driving support system according to claim 2, wherein the second object is an electronic apparatus that is installed adjacent to a road to monitor objects on the road and can communicate with the server.

4. The driving support system according to claim 2, wherein the second object is a cellphone.

5. The driving support system according to claim 2, wherein the second object is another vehicle.

6. The driving support system according to claim 2, wherein the display is projected onto a windshield of the vehicle.

7. The driving support system according to claim 1, wherein when the first object moves from the first monitoring area to a second monitoring area, the first controller generates a map according to list information regarding the second monitoring area received from the server, and the first monitoring area has an overlapping portion with the second monitoring area.

8. The driving support system according to claim 1, wherein the first controller generates the map of an area in the first monitoring area that includes targets detected according to the list information.

9. The driving support system according to claim 1, wherein a target detected according to the list information is displayed on the map.

10. The driving support system according to claim 1, wherein the list information includes weather information.

11. The driving support system according to claim 1, wherein the list information includes traffic information.

12. A driving support server, comprising:
a server;
communication interface through which the server communicates with a first monitoring device on a first object and a second monitoring device on a second object; and
a controller configured to:
receive target information based on images acquired in the first and the second monitoring devices and driving information including positions of the first and the second objects from the first and the second monitoring devices through the communication interface;
generate list information including the target information; and
transmit the list information to the first and second monitoring devices through the communication interface when the first and second objects are detected within a first monitoring area from the driving information.

13. The driving support server according to claim 12, wherein the first object is a vehicle.

14. The driving support server according to claim 13, wherein the second object is an electronic apparatus that is installed adjacent to a road to monitor objects on the road and can communicate with the server.

15. The driving support server according to claim 13, wherein the second object is a cellphone.

16. The driving support server according to claim 15, wherein
when the first object moves from the first monitoring area to a second monitoring area, the server transmits list information regarding the second monitoring area to the first monitoring device, and
the first monitoring area has an overlapping portion with the second monitoring area.

17. A driving support monitoring device on a vehicle comprising:
a controller configured to establish communication with an external monitoring device;
a camera configured to capture images of a periphery of the vehicle; and
a display, wherein
the controller is configured to:
acquire images from the camera;
detect a target in images acquired from the camera;
receive target information for the target from the external monitoring device;
generate list information including the calculated target information and the target information received from the external monitoring device;
generate a map according to the list information when the vehicle and the external monitoring device are within
a first monitoring area; and
display the map on the display.

18. The driving support monitoring device according to claim 17, wherein the external monitoring device is an electronic apparatus that is installed adjacent to a road to monitor objects on the road and can communicate with the vehicle.

19. The driving support monitoring device according to claim 17, wherein the external monitoring device is a cellphone.

20. The driving support monitoring device according to claim 17, wherein
when the vehicle moves from the first monitoring area to a second monitoring area, the first controller generates a map according to list information regarding the second monitoring area, and
the first monitoring area has an overlapping portion with the second monitoring area.

* * * * *